(12) United States Patent
Tomekawa et al.

(10) Patent No.: US 7,854,819 B2
(45) Date of Patent: Dec. 21, 2010

(54) MULTILAYER INFORMATION RECORDING MEDIUM AND PRODUCTION METHOD THEREFOR

(75) Inventors: Yuuko Tomekawa, Osaka (JP); Morio Tomiyama, Nara (JP); Keiji Nishikiori, Kyoto (JP); Masahiko Tsukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 536 days.

(21) Appl. No.: 11/914,678

(22) PCT Filed: May 15, 2006

(86) PCT No.: PCT/JP2006/309671

§ 371 (c)(1),
(2), (4) Date: Nov. 16, 2007

(87) PCT Pub. No.: WO2006/123619

PCT Pub. Date: Nov. 23, 2006

(65) Prior Publication Data

US 2009/0075016 A1 Mar. 19, 2009

(30) Foreign Application Priority Data

May 17, 2005 (JP) .............................. 2005-143746

(51) Int. Cl.
- B29C 65/14 (2006.01)
- B32B 37/14 (2006.01)
- B32B 38/10 (2006.01)
- C08F 2/46 (2006.01)
- C08J 7/18 (2006.01)
- B05D 3/10 (2006.01)

(52) U.S. Cl. .................. 156/247; 156/272.2; 156/273.7; 156/286; 427/487; 427/493; 427/302

(58) Field of Classification Search .................. 156/247, 156/272.2, 273.7, 285, 286; 427/487, 493, 427/127–132, 301, 302
See application file for complete search history.

(56) References Cited

U.S. PATENT DOCUMENTS 5,030,521 A * 7/1991 Nishikawa et al. ....... 428/843.4

(Continued)

FOREIGN PATENT DOCUMENTS

DE 102007060334 A1 * 2/2009

(Continued)

OTHER PUBLICATIONS

Patent Cooperation Treaty (PCT) International Preliminary Report on Patentability, issued Nov. 19, 2007.

(Continued)

*Primary Examiner*—Philip C Tucker
*Assistant Examiner*—Sing P Chan
(74) *Attorney, Agent, or Firm*—Wenderoth, Lind & Ponack L.L.P.

(57) ABSTRACT

A method for producing a multilayer information recording medium the method including: holding a substrate; feeding a resin onto the substrate; and removing the excess resin by moving a squeegee throughout the entire surface of the substrate. The substrate may have a resin-coated region, onto which the resin is to be applied, and a non-resin-coated region, onto which the resin is not to be applied. In this case, the resin-coated region has a smaller contact angle with the resin than the non-resin-coated region. The method for producing a multilayer information recording medium may further include, prior to feeding a resin onto the substrate, subjecting a specified area of the substrate to an oil repellent treatment to increase the contact angle of the specified area with the resin.

17 Claims, 9 Drawing Sheets

U.S. PATENT DOCUMENTS

| | | | | |
|---|---|---|---|---|
| 5,045,351 | A * | 9/1991 | Okita et al. | 427/130 |
| 5,063,119 | A * | 11/1991 | Ishida et al. | 428/843.1 |
| 5,091,268 | A * | 2/1992 | Nishikawa et al. | 428/843.4 |
| 5,164,259 | A * | 11/1992 | Ishida et al. | 428/323 |
| 5,169,721 | A * | 12/1992 | Bobrich et al. | 428/425.9 |
| 5,215,050 | A * | 6/1993 | Ruckert et al. | 123/193.5 |
| 5,322,733 | A * | 6/1994 | Doushita et al. | 428/336 |
| 5,428,096 | A * | 6/1995 | Fukunaga | 524/440 |
| 5,527,617 | A * | 6/1996 | Nishikawa et al. | 428/447 |
| 5,607,782 | A * | 3/1997 | Ishida et al. | 428/835.7 |
| 5,705,247 | A * | 1/1998 | Arai et al. | 428/64.1 |
| 5,714,222 | A | 2/1998 | Yokoyama | |
| 5,820,964 | A * | 10/1998 | Nakakawaji et al. | 428/833 |
| 6,077,642 | A * | 6/2000 | Ogata et al. | 430/171 |
| 6,316,057 | B1 * | 11/2001 | Hirayama et al. | 427/400 |
| 6,395,331 | B1 * | 5/2002 | Yan et al. | 427/169 |
| 6,932,890 | B2 * | 8/2005 | Dai et al. | 204/192.15 |
| 7,488,701 | B2 * | 2/2009 | Mizukami et al. | 503/201 |
| 2005/0031777 | A1 | 2/2005 | Hayashi et al. | |
| 2005/0077102 | A1 * | 4/2005 | Banter et al. | 181/149 |
| 2005/0142362 | A1 * | 6/2005 | Inaoka et al. | 428/411.1 |
| 2005/0208774 | A1 * | 9/2005 | Fukunaga et al. | 438/745 |
| 2006/0120265 | A1 * | 6/2006 | Mizukami et al. | 369/283 |
| 2006/0227695 | A1 * | 10/2006 | Nagaoka | 369/275.1 |

FOREIGN PATENT DOCUMENTS

| | | | |
|---|---|---|---|
| JP | 51068441 A | * | 6/1976 |
| JP | 63-106948 | | 5/1988 |
| JP | 6-8680 | | 1/1994 |
| JP | 8-263876 | | 10/1996 |
| JP | 11-126377 | | 5/1999 |
| JP | 11-232708 | | 8/1999 |
| JP | 2002-92969 | | 3/2002 |
| WO | 01/86648 | | 11/2001 |

OTHER PUBLICATIONS

International Search Report issued Aug. 15, 2006 in the International (PCT) Application of which the present application is the U.S. National Stage.

* cited by examiner

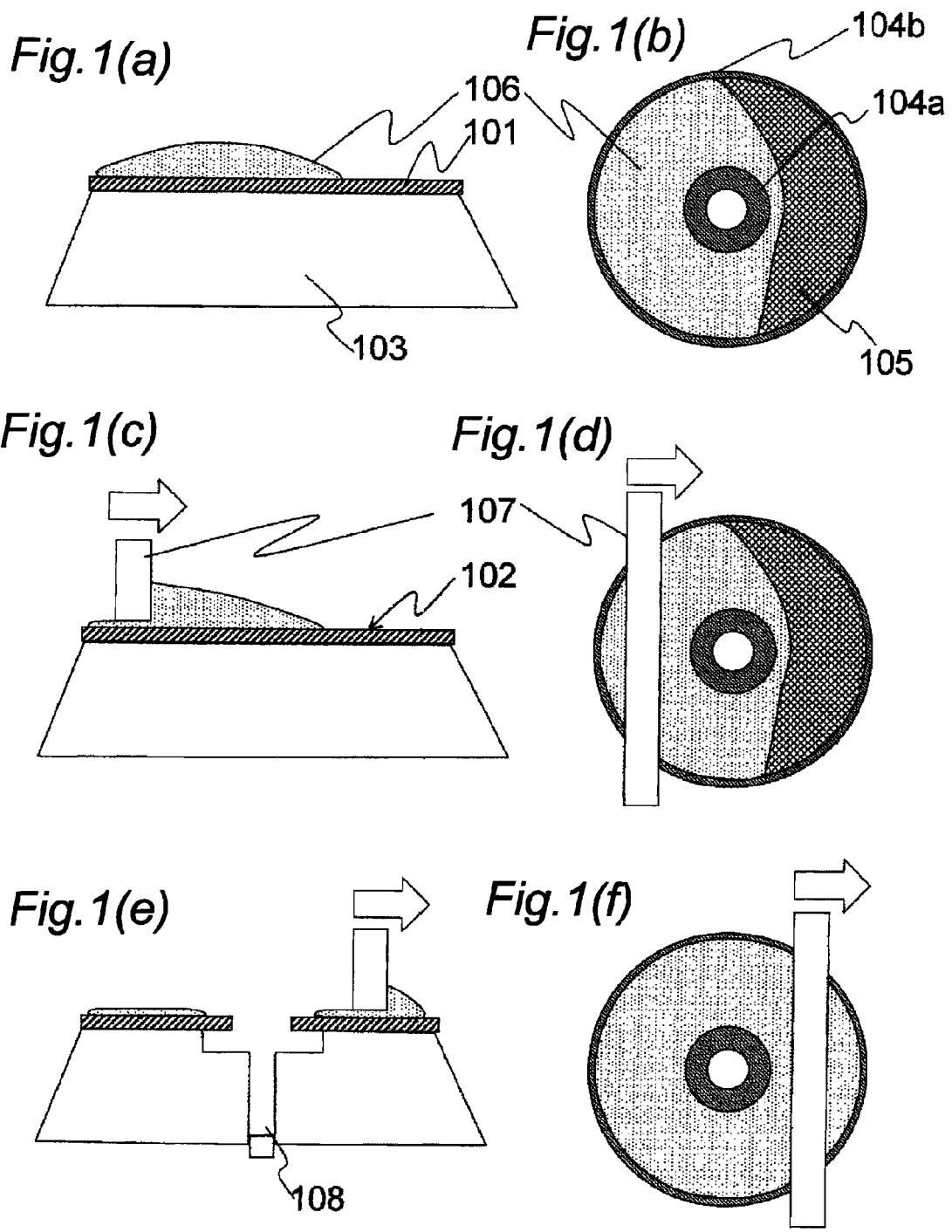

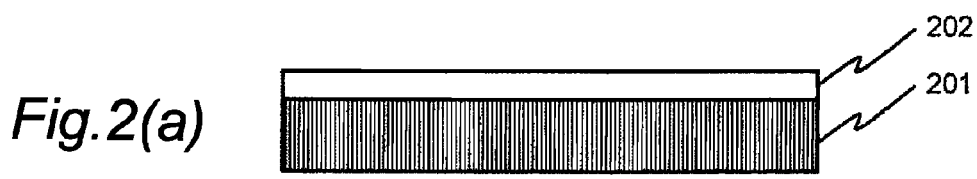
Fig.2(a)
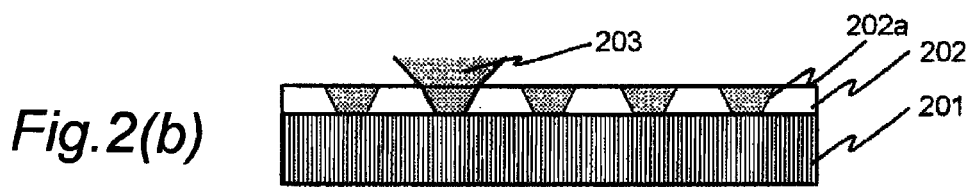
Fig.2(b)
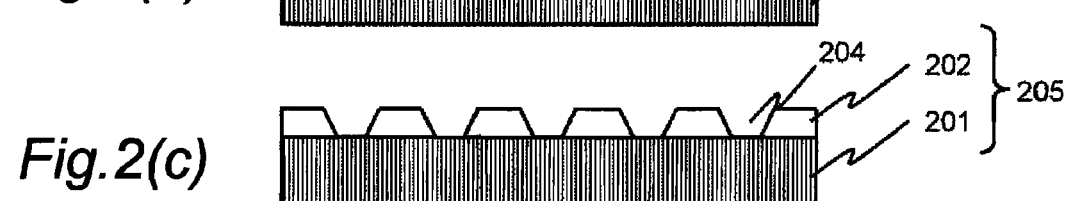
Fig.2(c)
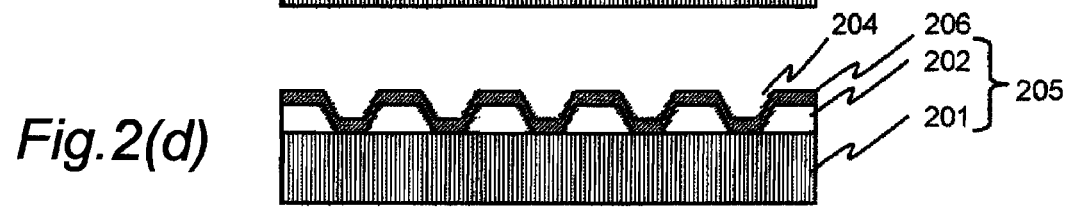
Fig.2(d)
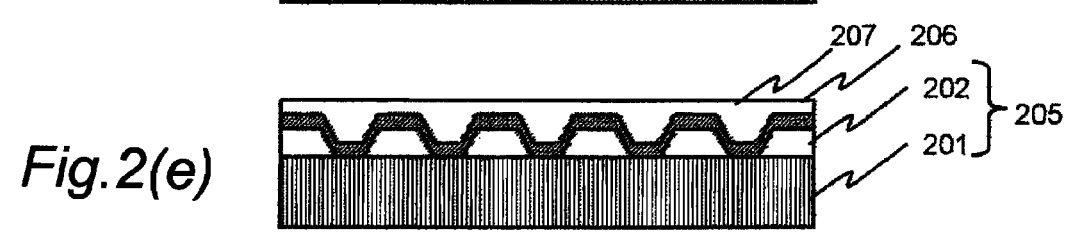
Fig.2(e)
Fig.2(f)
Fig.3
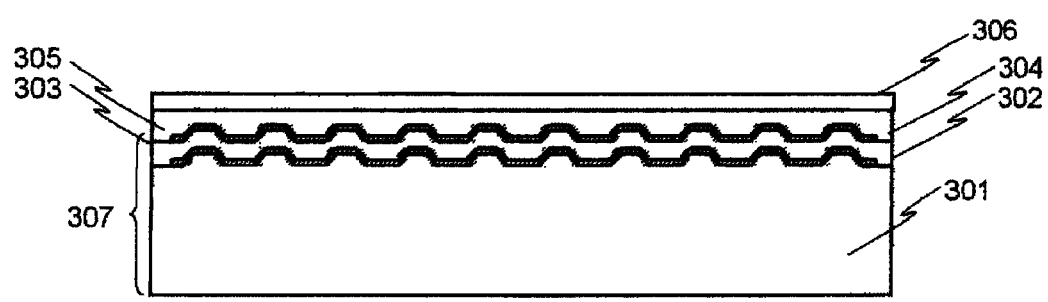

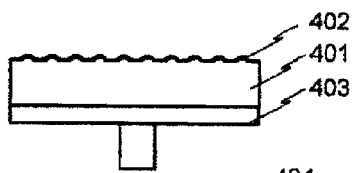
Fig.4(a)
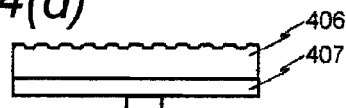
Fig.4(d)
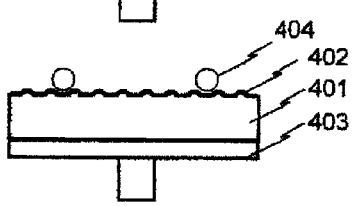
Fig.4(b)
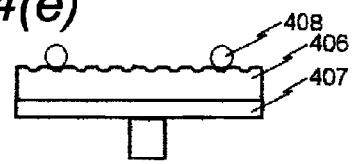
Fig.4(e)
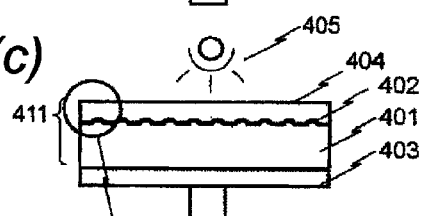
Fig.4(c)
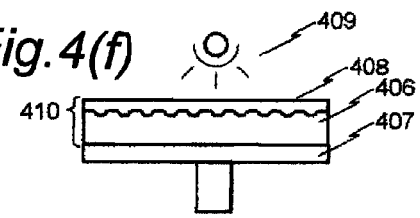
Fig.4(f)
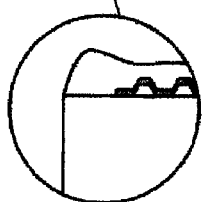
Fig.4(j)
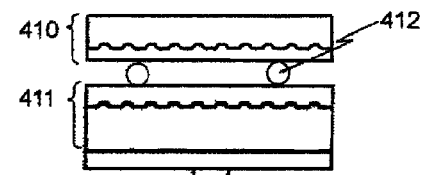
Fig.4(g)
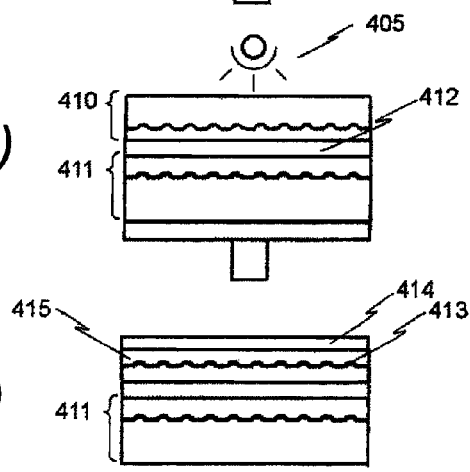
Fig.4(h)
Fig.4(i)

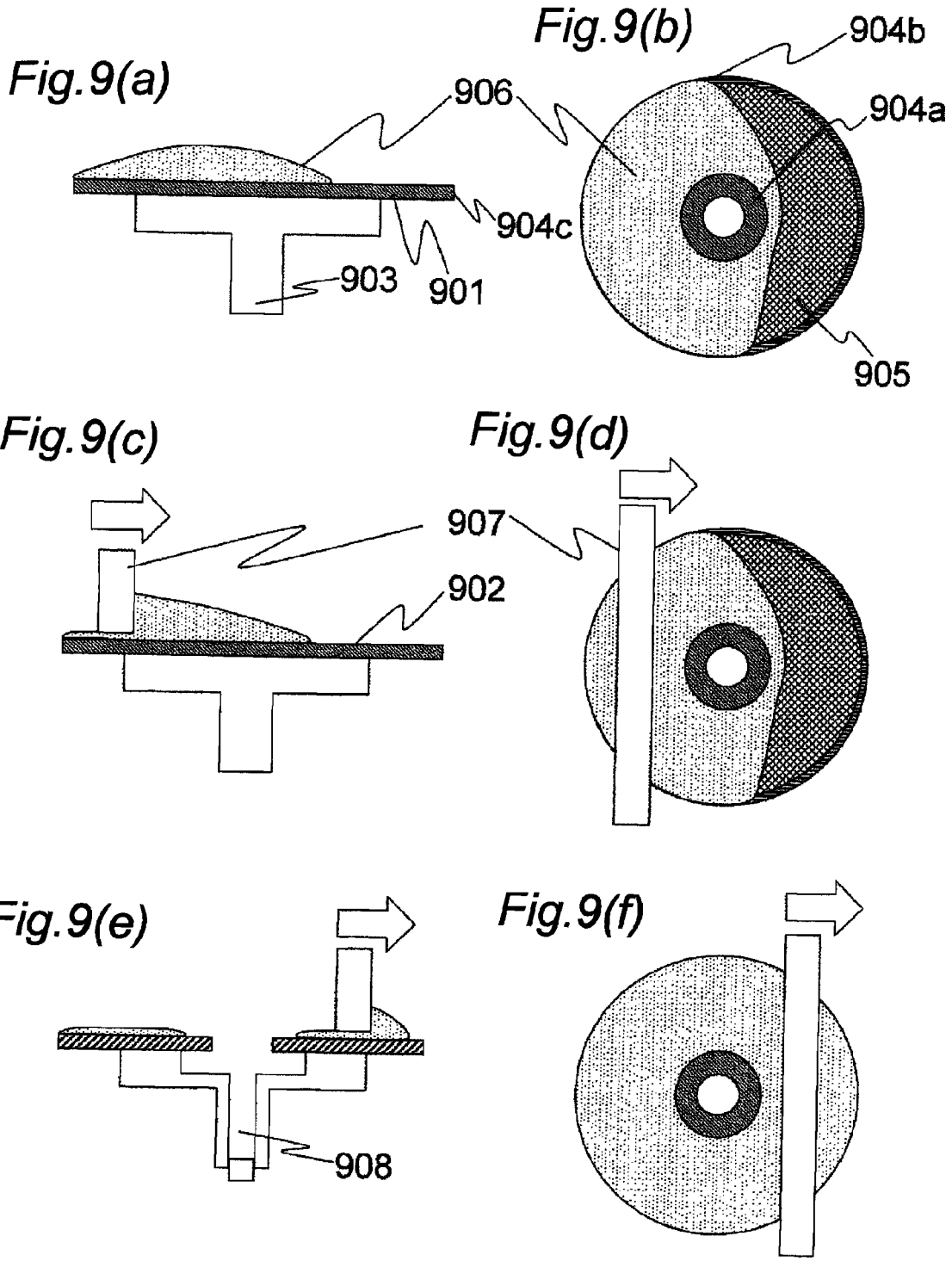

MULTILAYER INFORMATION RECORDING MEDIUM AND PRODUCTION METHOD THEREFOR

TECHNICAL FIELD

This application claims priority based on Japanese Patent Application No. 2005-143746 filed in Japan on May 17, 2005, the disclosure of which is incorporated herein by reference.

The present invention relates to a multilayer information recording medium for reproducing information or recording and reproducing information, and a method for producing such a multilayer information recording medium.

BACKGROUND ART

In recent years, the amount of information demanded is increasing, and therefore, in the field of information equipment, audiovisual equipment, and the like, attention is being given to an information recording medium, such as an optical disk, which is designed to have easy accessibility to data and a large storage capacity of data and contribute to downsizing of equipment in order to achieve higher-density information recording. For example, in the field of optical disks, there is proposed an optical recording medium having a storage capacity of about 25 GB an a single layer or about 50 GB in a dual layer under conditions where the wavelength of laser light is about 400 nm and the numerical aperture (NA) of a converging lens of a reproducing head for converging the laser light is 0.85, as described in Japanese Patent Laid-open Publication No. 2002-92969.

Hereinbelow, the structure of conventional multilayer information recording media described in Japanese Patent Laid-open Publication No. 2002-92969 and production methods thereof will be described with reference to FIGS. 2 to 4.

FIGS. 2(a) to 2(f) illustrate a method for producing a stamper that is a substrate production die to be used for producing a conventional multilayer information recording medium. The stamper is produced in the following manner. First, a photosensitive material, such as a photoresist, is applied onto a glass plate 201 to form a photosensitive film 202 (see FIG. 2(a)). Then, the photosensitive film 202 is exposed to laser light 203 to transfer a pattern of pits and/or guide grooves thereto (see FIG. 2(b)). As a result of this exposure, as shown in FIG. 2(b), a light-exposed portion 202a is formed. Then, the photosensitive film 202 is subjected to a development process to remove the photosensitive material of the light-exposed portion 202a. As a result, an optical recording master 205 having a pattern of pits and/or guide grooves 204 is produced (see FIG. 2(c)). On this pattern of pits and/or guide grooves 204 of the optical recording master 205, a conductive film 206 is formed by sputtering, vapor deposition, or the like. In this way, the shape of the pattern of pits and/or guide grooves 204 formed in the photosensitive film 202 is transferred to the conductive film 206 (see FIG. 2(d)). Further, a plating film 207 is formed on the conductive film 206 to increase the rigidity and thickness of the conductive film 206 (see FIG. 2(e)). Then, the conductive film 206 having the plating film 207 formed thereon is separated from the optical recording master 205 along the interface between the photosensitive film 202 and the conductive film 206 to obtain a stamper 208 (see FIG. 2(f)).

FIG. 3 is a cross-sectional view of the conventional multilayer information recording medium. The multilayer information recording medium includes a first signal substrate 301, a first thin film layer 302, a second signal substrate 303, a second thin film layer 304, and a transparent substrate 306, and a transparent layer 305. The first signal substrate 301 has a signal surface provided with pits and/or guide grooves formed by transfer, and the first thin film layer 302 is laminated on the signal surface of the first signal substrate 301. The second signal substrate 303 has a signal surface provided with pits and/or guide grooves formed by transfer on the opposite side of a surface thereof bonded to the first thin film layer 302. The second thin film layer 304 is laminated on the signal surface of the second signal substrate 303. The transparent substrate 306 is provided so as to be opposed to the second signal substrate 303. The transparent layer 305 is provided to laminate the second thin film layer 304 and the transparent substrate 306 together.

As described above, the first signal substrate 301 has a signal surface provided with pits and/or guide grooves formed by transfer. Such a signal surface is formed using the stamper 208 shown in FIG. 2(f) when the first signal substrate 301 is produced by injection compression molding or the like. On the thus formed signal surface, a thin film layer is laminated. Such a thin film layer laminated on the signal surface is referred to as an information recording layer. It is to be noted that a thickness of the first signal substrate 301 is about 1.1 mm.

The first thin film layer 302 includes a recording film and/or a reflective film, and is formed by sputtering, vapor deposition, or the like on the signal surface of the first signal substrate 301 provided with pits and/or guide grooves.

The second signal substrate 303 is formed in the following manner. First, the first signal substrate 301 having the first thin film layer 302 laminated thereon is spin-coated with a photo-curing resin to form a photo-curing resin layer, and then a signal transfer substrate having a signal surface provided with pits and/or guide grooves is laminated on the photo-curing resin layer so that the signal surface of the signal transfer substrate faces toward the first signal substrate 301. The photo-curing resin is cured by irradiation with light, and then the signal transfer substrate is separated from the first signal substrate 301 along the interface between the signal transfer substrate and the photo-curing resin layer to obtain a second signal substrate as a resin layer having a signal surface. The second thin film layer 304 is formed on the second signal substrate 303 in the same manner as in the case of forming a first thin film layer 302.

Finally, the transparent substrate 306 is formed using a material transparent to recording/reproducing light (i.e., a material having optical transparency) so as to have a thickness of about 0.1 mm. Between the transparent substrate 306 and a laminated substrate 307, there is provided the transparent layer 305 to bond them together. The transparent layer 305 is formed of a photo-curing resin or an adhesive such as a pressure-sensitive adhesive.

The recording/reproducing of information onto/from the thus formed multilayer information recording medium is performed by allowing recording/reproducing laser light to enter the multilayer information recording medium from the transparent substrate 306 side thereof.

FIGS. 4(a) to 4(j) illustrate a method for producing another conventional multilayer information recording medium different from the above-described one. This production method will be described with reference to FIGS. 4(a) to 4(j).

First, a first signal substrate 401 is fixed to a turntable 403 by means of vacuum suction or the like (see FIG. 4(a)). Then, a first thin film layer 402 containing a recording film material and/or a reflective film material is laminated by sputtering, vapor deposition, or the like on a first signal surface of the first signal substrate 401 provided with pits and/or guide grooves to form a first information recording layer. Onto the first thin film layer 402 formed on the first signal substrate 401 fixed to the turntable 403, a photo-curing resin A 404 is fed by a dispenser in such a manner as to form a circle concentric with the first signal substrate at the inner radius of the first signal substrate (see FIG. 4(b)). Then, the first thin film layer 402 is coated with the photo-curing resin A 404 by spinning the turntable 403. At this time, the excess resin and air bubbles are removed from the photo-curing resin A 404 by centrifugal force. In addition, the thickness of the coating of the photo-curing resin A 404 can be adjusted to a desired value by appropriately setting the viscosity of the photo-curing resin A 404, the number of revolutions of the turntable 403, the rotation time of the turntable 403, ambient conditions (e.g., temperature, humidity) around the turntable 403, and the like. After the rotation of the turntable 403 is stopped, the coating of the photo-curing resin A 404 is cured by irradiation with light emitted from a light irradiator 405 (see FIG. 4(c)).

Then, a second information recording surface is formed on the first signal substrate 401 in the following manner. A transfer substrate 406 having a signal surface provided with pits and/or guide grooves is fixed to a turntable 407 (see FIG. 4(d)). Onto the transfer substrate 406 fixed to the turntable 407, a photo-curing resin B 408 is fed by a dispenser in such a manner as to form a circle concentric with the transfer substrate 406 at the inner radius of the transfer substrate 406 (see FIG. 4(e)). Then, the transfer substrate 406 is coated with the photo-curing resin B 408 by spinning the turntable 407. As in the case of coating with the photo-curing resin A 404, the thickness of the coating of the photo-curing resin B 408 can be adjusted to a desired value. After the rotation of the turntable 407 is stopped, the coating of the photo-curing resin B 408 is cured by irradiation with light emitted from a light irradiator 409 (see FIG. 4(f)).

The thus obtained two substrates 410 and 411 are laminated together on the turntable 403 with a photo-curing resin C 412 being interposed therebetween so that their respective cured resin layers 404 and 408 are opposed to each other (see FIG. 4(g)). The substrates 410 and 411 laminated together in such a manner as described above is spun on the turntable 403 so that the thickness of the photo-curing resin C 412 is adjusted to a desired value. Then, the photo-curing resin C 412 is cured by irradiation with light emitted from the light irradiator 405 (see FIG. 4(h)). After the substrates 410 and 411 are bonded together with the photo-curing resin C 412, the transfer substrate 406 is separated from the substrate 410 along the interface between the transfer substrate 406 and the cured resin layer 408. In this way, a second signal surface is formed on the first signal substrate 401.

It is to be noted that the photo-curing resin A 404 is selected from resins having good adhesion to the first thin film layer 402 and the photo-curing resin C 412, and the photo-curing resin B 408 is selected from resins having good releasability from the transfer substrate 405 and good adhesion to the photo-curing resin C 412. These photo-curing resins A, B, and C may be the same or different from each other. In addition, the photo-curing resins A, B, and C each have a viscosity of about 0.15 Pa·s to make the thickness of their respective resin layers as small as possible.

Subsequently, on the second signal surface formed on the first signal substrate 401, a second thin film layer 413 containing a recording film material and/or a reflective film material is formed by sputtering, vapor deposition, or the like. The second thin film layer 413 serves as a second information recording layer. Finally, a transparent layer 415, which is substantially transparent to recording/reproducing light (i.e., which substantially transmits recording/reproducing light), is formed to bond the second thin film layer 413 and a transparent substrate 414 together. Such a transparent layer 415 is formed in the following manner. A photo-curing resin is dropped onto the second thin film layer 413. After the second thin film layer 413 is coated with the photo-curing resin by spinning the turntable 403, air bubbles contained in the photo-curing resin is removed and the thickness of the coating of the photo-curing resin is controlled. Then, the photo-curing resin is cured by irradiation with light to form a transparent layer 415 (see FIG. 4(i)).

SUMMARY OF THE INVENTION

However, in a case where a transparent resin layer for separating adjacent information recording layers is formed by a spin-coating method, a slight thickness variation occurs in the peripheral direction of the resin layer and a large thickness variation occurs in the radial direction of the resin layer. In particular, a plurality of resin layers are provided in an information recording medium, their respective thickness variations are accumulated to cause a large variation in the thickness of the entire information recording medium. Further, in the case of using a spin-coating method, the coating of a photo-curing resin reaches the edge of a signal substrate, and therefore when being cured by irradiation with light after the completion of spin-coating, the spin-coated photo-curing resin on the outer peripheral portion of the signal substrate is raised by surface tension so that the thickness of the outer peripheral portion of the signal substrate is larger than that of the other portion (see FIG. 4(j)). When signals are recorded/reproduced onto/from a medium using laser light, there are problems that such a thickness variation in the signal substrate causes spherical aberration and thus an aperture for a light spot fluctuates, and the thickness variation in the signal substrate also adversely affects the focusing control for focusing a light spot on an information recording layer and the tracking control for allowing a light spot to follow a signal. Furthermore, in the case of using a spin-coating method, it is necessary to perform spin-coating for each resin layer, and therefore it is difficult to reduce a tact time.

Therefore, the methods for forming a resin layer separating adjacent information recording layers other than a spin-coating method have been studied. Generally, the following methods are mainly used for forming a plastic sheet or film:

(1) a method in which a heated resin in a liquid state is extruded through a T-shaped die (i.e., a T-die method);

(2) a gravure coating method in which a coating agent is taken up from a coating agent bath by a gravure roll, and the excess coating agent is removed by a doctor blade, and the coating agent is transferred onto a supporting member held on a rotating roll;

(3) a calendar method in which a resin is rolled between rolls; and (4) a casting method in which a solution obtained by dissolving a resin in an organic solvent or water is flow-cast on a supporting table.

In the case of producing a multilayer information recording medium it is necessary to directly apply a resin or the like onto a signal substrate to form a resin layer without imposing thermal and physical loads on the signal substrate and information recording layers laminated on the signal substrate. From such a viewpoint, it can be said that the casting method described in (4) is suitable for producing a multilayer information recording medium. However, it is difficult to achieve thickness uniformity at a level required of the above-described multilayer information recording medium having a storage capacity of 50 GB or more by simply using a casting method.

In order to solve the above problems of the prior art, it is therefore an object of the present invention to provide a multilayer information recording medium and a method for producing the multilayer information recording medium for the purposes of forming a resin layer between information recording layers so as to have a uniform thickness at high speed, and reducing the frequency of maintenance of production equipment so as to lower.

In order to solve the conventional problems described above, the present invention is directed to a method for producing a multilayer information recording medium having at least two information recording layers and a resin layer interposed between each pair of the information recording layers, the method including: holding a substrate; feeding a resin onto the substrate; and removing the excess resin by moving a squeegee throughout the entire surface of the substrate in such a manner that the interval between the bottom surface of the squeegee and the surface of the substrate is kept constant.

In the present invention, the substrate preferably has a resin-coated region, onto which the resin is to be applied, and a non-resin-coated region, onto which the resin is not to be applied. In this case, the resin-coated region has a smaller contact angle with the resin than the non-resin-coated region.

Further, it is preferred that the method for producing a multilayer information recording medium further includes, prior to feeding a resin onto the substrate, subjecting a specified area of the substrate to an oil repellent treatment to increase the contact angle of the specified area with the resin.

In the step of the oil repellent treatment, a metal film may be formed on the specified area of the substrate. In this case, the metal film preferably contains, as a main component, at least one of Au, Cu, and Ni.

Alternatively, in the step of carrying out the oil repellent treatment, an oil repellent seal, having a thickness smaller than that of a resin layer to be formed on the substrate, may be attached to the specified area of the substrate.

The specified area to be subjected to oil repellent treatment may include the inner peripheral portion and the outer peripheral portion of the substrate.

Removing the excess resin may be performed by moving the squeegee throughout the entire surface of the substrate so that the bottom surface of the squeegee becomes parallel to the surface of the substrate to keep the interval between the bottom surface of the squeegee and the surface of the substrate constant.

The resin may be a UV-curing resin.

Holding a substrate may be performed by holding a substrate onto a substrate-holding table. In this case, it is preferred that the inner diameter of the substrate-holding table is larger than that of the substrate, and the outer diameter of the substrate-holding table is smaller than that of the substrate. Further, it is also preferred that the substrate-holding table has oil repellency to the resin.

The substrate may be a signal transfer substrate having a signal surface. In this case, the method for producing a multilayer information recording medium may further includes: laminating a signal substrate having an information recording layer on the surface of the signal transfer substrate coated with the resin so that the information recording layer faces toward the signal transfer substrate; curing the resin interposed between the signal transfer substrate and the signal substrate to form a resin layer; and separating the signal transfer substrate from the cured resin layer along the interface between them.

Laminating together the signal transfer substrate and the signal substrate having an information recording layer formed thereon may be performed in a vacuum atmosphere. The signal transfer substrate may be made of a polyolefin resin.

Alternatively, the substrate may be a signal substrate having a signal surface formed thereon. In this case, the method for producing a multilayer information recording medium may further include: laminating a signal transfer substrate having a signal surface on the surface of the signal substrate coated with the resin so that the signal surface of the signal transfer substrate faces toward the signal substrate; curing the resin interposed between the signal substrate and the signal transfer substrate to form a resin layer; and separating the signal transfer substrate from the cured resin layer along the interface between them.

Laminating together the signal substrate and the signal transfer substrate having a signal surface may be performed in a vacuum atmosphere.

The information recording medium relating to the present invention is characterized in producing by the above described method for producing a multilayer information recording medium according to the present invention. The multilayer information recording medium according to the present invention has excellent uniformity in the thickness of a resin layer interposed between each pair of information recording layers, which makes it possible to achieve a small fluctuation in an optical path length from a light source to each information recording layer of the medium, to suppress a fluctuation in an aperture for a light spot resulting from optical aberration, and to stabilize focusing control and tracking control.

According to the present invention, it is possible to provide a multilayer information recording medium having excellent uniformity in the thickness of a resin layer interposed between each pair of information recording layers and therefore achieving good recording/reproducing of signals, and a method for producing such a multilayer information recording medium.

BRIEF DESCRIPTION OF THE DRAWINGS

The present invention will become readily understood from the following description of preferred embodiments thereof made with reference to the accompanying drawings, in which like parts are designated by like reference numeral and in which:

FIGS. 1(a) to 1(f) illustrate applying a resin according to a first embodiment of the present invention, wherein FIG. 1(a) is a cross-sectional view which shows feeding a resin onto a substrate, FIG. 1(b) is a plan view of FIG. 1(a), FIG. 1(c) is a cross-sectional view which shows removing the excess resin by moving a squeegee, FIG. 1(d) is a plan view of FIG. 1(c), FIG. 1(e) is a cross-sectional view which shows a state after the moving squeegee is passed through a center hole of the substrate, and FIG. 1(f) is a plan view of FIG. 1(e);

FIGS. 2(a) to 2(f) are cross-sectional views which respectively show the steps of a method for producing a substrate production die to be used for producing a conventional multilayer information recording medium;

FIG. 3 is a cross-sectional view of the conventional multilayer information recording medium;

FIGS. 4(a) to 4(j) are cross-sectional views which respectively show the steps of a method for producing another conventional multilayer information recording medium;

FIGS. 9(a) to 9(f) illustrate the steps of applying a resin onto a substrate to form a transparent layer in the method for producing a multilayer information recording medium according to the fourth embodiment of the present invention, wherein FIG. 9(a) is a cross-sectional view which shows feeding a resin onto a substrate, FIG. 9(b) is a plan view of FIG. 9(a), FIG. 9(c) is a cross-sectional view which shows removing the excess resin by moving a squeegee, FIG. 9(d) is a plan view of FIG. 9(c), FIG. 9(e) is a cross-sectional view which shows a state after the moving squeegee is passed through a center hole of the substrate, and FIG. 9(f) is a plan view of FIG. 9(e);

FIGS. 11A to 11D illustrate the oil repellent treatment in the method for producing a multilayer information recording medium according to the first embodiment of the present invention, wherein FIG. 11A is a plan view which shows preparing a substrate, FIG. 11B is a plan view which shows forming a mask on a resin-coated region; FIG. 11C is a plan view which shows forming a coating of an oil repellent material; and FIG. 11D is a plan view which shows removing the mask;

Figure 5:
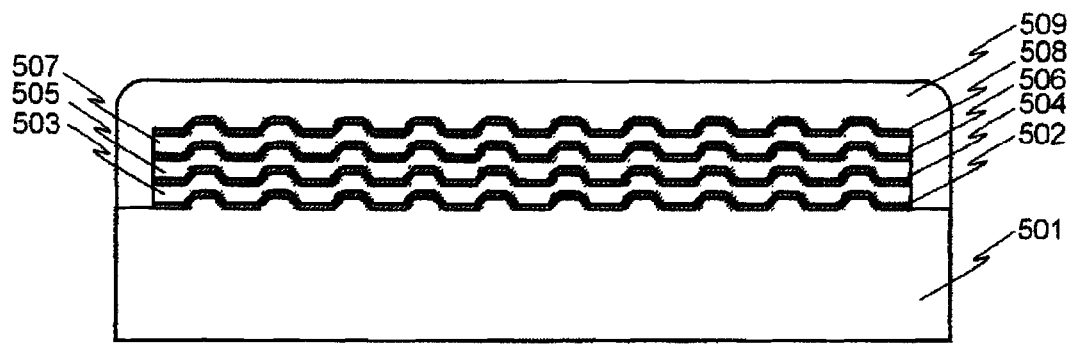
FIG. 5 is a cross-sectional view, which shows the structure of a multilayer information recording medium according to a first embodiment of the present invention.

REFERENCE NUMERAL 101 signal transfer substrate
102 signal surface
103 table
104, 104a, 104b non-resin-coated region
105 resin-coated region/UV-curing resin layer (in an uncured state)
106 UV-curing resin
107 squeegee
108 space
109 mask
110 oil repellent material
201 glass plate
202 photosensitive film
203 laser light
204 pattern of pits and/or guide grooves
205 optical recording master
206 conductive film
207 plating film
208 stamper
301 first signal substrate
302 first thin film layer
303 second signal substrate
304 second thin film layer
305 transparent layer
306 transparent substrate
307 laminated substrate
401 first signal substrate
402 first thin film layer
403 turntable
404 photo-curing resin A/resin layer after photo-curing
405 light irradiator
406 transfer substrate
407 turntable
408 photo-curing resin B/resin layer after photo-curing
408 light irradiator
410 substrates
411 substrates
412 photo-curing resin C/resin layer after photo-curing
413 second thin film layer
414 transparent substrate
415 transparent layer
501 first signal substrate
502 first thin film layer
503 second signal substrate
504 second thin film layer
505 third signal substrate
506 third thin film layer
507 fourth signal substrate
508 fourth thin film layer
509 transparent layer
601 first signal substrate
602 signal surface provided with pits and/or guide grooves
603 reflective film
604 dielectric film
605 recording film
606 dielectric film
701 vacuum chamber
703 vacuum pump
704 pressure plate
705 UV irradiator
801 vacuum chamber 804 pressure plate
805 UV irradiator
806 resin layer
901 first signal substrate
902 recording surface
903 substrate-holding table
904 non-resin-coated region
905 resin-coated region
906 UV-curing resin
907 squeegee
908 center hole

DESCRIPTION OF THE PREFERRED EMBODIMENTS

Hereinbelow, a method for producing a multilayer information recording medium according to the present invention will be described with reference to the following embodiments shown in the accompanying drawings. It is to be noted that an example of the structure of a multilayer information recording medium according to the present invention will be described based on the following embodiments of an optical disk type, but the multilayer information recording medium according to the present invention is not limited thereto, and the present invention can also be applied to information recording media generally used such as memory cards and the like.

First Embodiment

FIG. 5 is a cross-sectional view of a multilayer information recording medium according to a first embodiment of the present invention. The multilayer information recording medium includes a first signal substrate 501, a first thin film layer 502, a second signal substrate 503, a second thin film layer 504, a third signal substrate 505, a third thin film layer 506, a fourth signal substrate 507, a fourth thin film layer 508, and a transparent layer 509. The first signal substrate 501 is a substrate having a signal surface provided with pits and/or guide grooves with concavo-convex shape, and the first thin film layer 502 is provided on the signal surface of the first signal substrate 501. The second signal substrate 503 has a signal surface provided with pits and/or guide grooves with concavo-convex shape, the signal surface being provided on the opposite side of the first signal substrate 501, and the second thin film layer 504 is provided on the signal surface of the second signal substrate 503. The third signal substrate 505 has a signal surface provided with pits and/or guide grooves with concavo-convex shape, the signal surface being provided on the opposite side of the second signal substrate 503, and the third thin film layer 506 is provided on the signal surface of the third signal substrate 505. The fourth signal substrate 507 has a signal surface provided with pits and/or guide grooves with concavo-convex shape, the signal surface being provided on the opposite side of the third signal substrate 505, and the fourth thin film layer 508 is provided on the signal surface of the fourth signal substrate 507. The transparent layer 509 is provided on the fourth thin film layer 508.

The first signal substrate 501 is formed from a disk made of polycarbonate or an acrylic resin and having an outer diameter $\phi$ of 120 mm and a thickness of about 1.0 to 1.1 mm to improve warpage and rigidity of the information recording medium and, in addition, to provide with mechanical compatibility with optical disks such as CDs, DVDs, and Blu-ray Discs to the information recording medium. As described above, the first signal substrate 501 has a signal surface provided with pits and/or guide grooves with concavo-convex shape. Such a signal surface is formed using a conventional stamper shown in FIG. 2(f) when the first signal substrate 501 is produced by resin molding such as injection compression molding. Each of the signal substrates has a center hole (not shown in the Figures) having a diameter $\phi$ of 15 mm at the center thereof, by which the disk is rotatably held to a player to record/reproduce signals. The multilayer information recording medium according to the first embodiment uses a polycarbonate substrate as the first signal substrate 501.

On the first signal substrate 501, resin layers (i.e., the signal substrates 503, 505, and 507 and the transparent layer 509 shown in FIG. 5) are laminated in order by forming a coating of a UV-curing resin and curing it. In a case where the signal substrates are laminated with their signal surfaces facing up, curing shrinkage typical of a UV-curing resin occurs so that an obtained information recording medium has a concave warp. Such a concave warp can be canceled by previously forming the first signal substrate 501 so as to have a convex warp when the signal surface thereof faces up. By doing so, it is possible to cancel warpage occurring in the information recording medium after laminating resins layers, that is, the signal substrates 503, 505, and 507 and the transparent layer 509 to thereby obtain a flat information recording medium. It is to be noted that the signal substrates 503, 505, and 507 are resin layers each having a signal surface formed by transfer.

In a case where the information recording medium is of a Read Only-type (ROM), the first thin film layer 502 almost totally reflects reproducing laser light. Such a first thin film layer 502 is formed of a metal or a semiconductor, such as Al, Ag, Au, Si, or $SiO_2$, or a dielectric material by sputtering, vapor deposition or the like.

Figure 6:
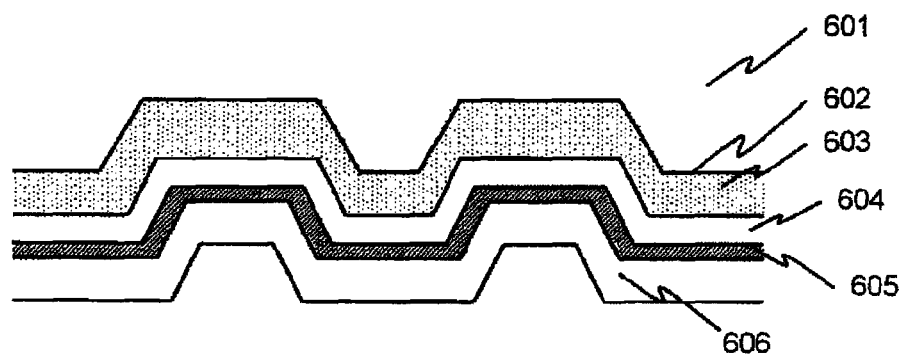
FIG. 6 is a cross-sectional view, which shows the structure of a thin film layer (i.e., an information recording film) of a write once-type information recording medium.

On the other hand, in a case where the information recording medium is of a Write Once-type, the following thin film layers (i.e., recording films) are required. Hereinbelow, the structure of the thin film layers will be described in detail with reference to FIG. 6. First, on a signal surface 602 provided with pits and/or guide grooves formed on a first signal substrate 601, a reflective film 603 made of AlCr, a dielectric film 604 made of ZnS, a recording film 605 made of TeOPd, and a dielectric film 606 made of ZnS are sequentially laminated in order by sputtering, vapor deposition, or the like. The first thin film layer 502 used herein includes the reflective film 603, the dielectric film 604, the recording film 605, and the dielectric film 606. In this regard, it is to be noted that the reflective film 603 used herein is made of AlCr, but may also be made of a material containing, as a main component, a metal such as Ag or Au as in the case of the ROM. The thin film layer may further include a pigment layer or the like. The second thin film layer 504, the third thin film layer 506, and the fourth thin film layer 508 also have the same structure as the first thin film layer 502. The optical characteristics of the information recording medium during recording/reproducing information can be controlled by adjusting the thickness of the reflective film 603 or removing the reflective film 603 itself and/or by adjusting the thickness of the dielectric film 604 and/or the recording film 605.

The second signal substrate 503 is preferably transparent to recording/reproducing light (i.e., has high optical transparency). Such a second signal substrate 503 is a resin layer formed by, for example, applying a UV-curing resin containing an acrylic resin as a main component onto the first thin film layer 502 and curing it. The UV-curing resin is effective at controlling the shape of the resin layer because it absorbs light in the UV wavelength range, and therefore it is possible to cure it at desired timing by irradiation with UV rays.

The second signal substrate 503 as a resin layer is formed in the following manner. First, a liquid UV-curing resin is applied onto the first thin film layer 502, and then a signal transfer substrate having a signal surface provided with pits and/or guide grooves with concavo-convex shape is pressed against the UV-curing resin. Then, the UV-curing resin is irradiated with UV rays to cure it. After the UV-curing resin is cured, the signal transfer substrate is separated from the UV-curing resin layer along the interface between them. In this way, a resin layer (i.e., a second signal substrate) is formed. It is to be noted that the UV-curing resin is applied onto the first signal substrate 502 in such a manner that the outer diameter of the second signal substrate is smaller than that of the first signal substrate 501 but the inner diameter of the second signal substrate 502 is larger than the diameter of the center hole (not shown in the Figures) of the first signal substrate 501. The third signal substrate 505 and the fourth signal substrate 507 are formed in the same manner as in the case of the second signal substrate 503 so as to have the same shape as the second signal substrate 503.

The transparent layer 509 is also preferably transparent to recording/reproducing light (i.e., has high optical transparency). Such a transparent layer 509 is formed by, for example, applying a liquid (uncured) UV-curing resin containing an acrylic resin as a main component onto the fourth thin film layer 508 and then curing the UV-curing resin by irradiation with UV rays. The thus formed transparent layer 509 covers the signal substrates and the thin film layers, and directly bonds to the inner peripheral portion and the outer peripheral portion of the first signal substrate 501.

Hereinbelow, a method for producing a multilayer information recording medium according to the first embodiment of the present invention will be described with reference to FIGS. 1(a) to 1(f). FIG. 1(a) is a schematic diagram of a casting apparatus as viewed from the side thereof, which shows a state where a resin is fed onto a substrate placed on the casting apparatus. FIG. 1(b) is a schematic diagram of the casting apparatus in the state shown in FIG. 1(a), as viewed from above. FIG. 1(c) is a schematic diagram of the casting apparatus as viewed from the side thereof, which shows a state where the resin is started to be applied onto the substrate. FIG. 1(d) is a schematic diagram of the casting apparatus in the state shown in FIG. 1(c), as viewed from above. FIG. 1(e) is a cross-sectional view of the casting apparatus and the substrate, which shows a state where a squeegee is moved above the substrate to pass through the center hole so that a coating of the resin has an area more than one-half of the total area of the substrate. FIG. 1(f) is a schematic diagram of the casting apparatus and the substrate in the state shown in FIG. 1(e), as viewed from above.

(a) First, as shown in FIGS. 1(a) and 1(b), a signal transfer substrate 101 is fixed to a table 103 for holding a substrate by means of vacuum suction or the like. At this time, the vacuum suction force is controlled to prevent the signal transfer substrate 101 from being deformed by the effect of reduced pressure resulting from vacuum suction. The signal transfer substrate 101 has a signal surface 102 provided with desired grooves or grooves each having a reversed shape of a pit or pits, which are to be formed on a multilayer information recording medium. The signal transfer substrate 101 is made of a polyolefin material having good releasability from a resin layer obtained by curing a coating of a UV-curing resin 106, and has a thickness of 0.3 to 0.6 mm. By forming a signal transfer substrate 101 using a polyolefin material, it is possible to easily form a signal surface provided with pits and/or guide grooves with concavo-convex shape on the signal transfer substrate 101 with the use of a conventional stamper at the same time as forming the signal transfer substrate 101 by resin molding such as injection compressing molding. In addition, a polyolefin material also has a property of transmitting UV rays and thus has a characteristic capable of efficiently curing a coating of a UV-curing resin by irradiating with UV rays passing through the signal transfer substrate 101. The signal transfer substrate 101 used herein has a signal surface 102 provided with guide grooves each having a depth of 25 nm.

In a case where a resin layer for separating information recording layers from each other is formed by a casting method as in the case of this embodiment, a thickness variation in the signal transfer substrate 101 and the profile irregularity of the signal surface 102 have direct effect on the thickness of a resin layer to be formed on the signal transfer substrate 101. For this reason, the table 103 preferably has high flatness, and the degree of deformation of the signal transfer substrate 101 caused by suction is preferably as small as possible. Therefore, the multilayer information recording medium according to this embodiment is produced using the signal transfer substrate 101 having a thickness of 0.6 mm (±5 μm) and the table 103 made of stainless steel and having 40 suction holes each having a diameter φ of 2 mm.

In addition, the inner diameter of the table 103 is preferably larger than that of the signal transfer substrate 101 and the outer diameter of the table 103 is preferably smaller than that of the signal transfer substrate 101. This makes it possible to prevent an excess resin from coming into contact with the table 103. If an excess resin comes into contact with the table 103, the possibility that the resin is adhered to the side and back surfaces of the signal transfer substrate 101 is increased. In order to prevent such adherence, the table 103 preferably has a size smaller than that of the signal transfer substrate 101.

Figure 12A:
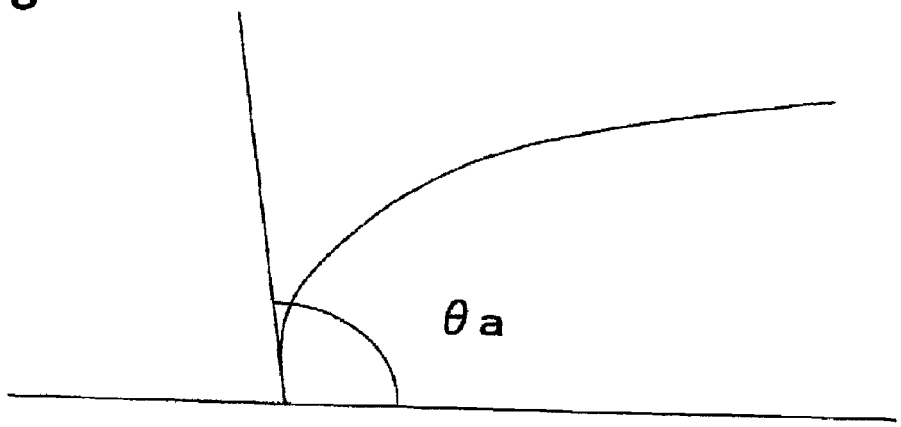
FIG. 12A is an illustration which shows that the non-resin-coated region has a large contact angle with a resin, and therefore has oil repellency.
Figure 12B:
FIG. 12B is an illustration which shows that the resin-coated region has a small contact angle with a resin, and therefore has good wettability with the resin.

(b) Next, oil repellent treatment to be performed on inner and outer peripheral portions 104a and 104b as non-resin-coated regions will be described. The oil repellent treatment refers to treatment for providing with oil repellency to the non-resin-coated regions 104a and 104b so that the non-resin-coated regions 104a and 104b can have lower wettability with a UV-curing resin and a larger contact angle with a UV-curing resin than the resin-coated region 105. That is, the oil repellent treatment is achieved by treating at least either the non-resin-coated region or the resin-coated region so that the non-resin-coated regions 104a and 104b can have a larger contact angle with a UV-curing resin than the resin-coated region 105. The term "contact angle" used herein refers to an angle formed between the surface of a resin (liquid) and the surface of a substrate (i.e., an angle within a liquid) at a point where the free surface of the resin is in contact with the substrate. FIG. 12A shows an example of a case where the non-resin-coated region has a large contact angle with a resin and therefore exhibits oil repellency. On the other hand, FIG. 12B shows an example of a case where the resin-coated region has a small contact angle with a resin and therefore exhibits good wettability with the resin.

In the case of typical optical disks such as CDs and DVDs, an inner peripheral region of a substrate is generally used as a clamping region for holding a multilayer information recording medium during signal reproduction, and therefore is not used as a signal surface. In addition, an outer peripheral region of the substrate is not used as a signal surface either because it is difficult to transfer guide grooves and/or pits to the outermost peripheral portion of a signal transfer substrate produced by injection molding. For these reasons, the signal transfer substrate 101 has the resin-coated region 105, onto which a UV-curing resin is to be applied, and the non-resin-coated regions 104a (i.e., the inner peripheral portion) and 104b (i.e., the outer peripheral portion), onto which a UV-curing resin is not to be applied.

In the case of the first embodiment, the inner peripheral portion 104a as a non-resin-coated region includes an inner side surface of the disk forming a center hole having a diameter φ of 15 mm and an area surrounding the center hole and having a width of 10 mm from the edge of the center hole in the radial direction. On the other hand, the outer peripheral portion 104b as a non-resin-coated region includes an area outside a circle having a radius of 59.0 mm from the center of the disk but inside a circle having a radius of 60.0 mm from the center of the disk (i.e., inside the outer edge of the disk) and an outer side surface of the disk.

Hereinbelow, among various methods for oil repellent treatment, a method for providing with oil repellency to the inner and outer peripheral portions 104a and 104b as non-resin-coated regions by applying an oil repellent material thereonto will be described. Examples of the oil repellent material include higher aliphatic carboxylic acids, amides, metal salts, aromatic phosphoric acids, fluorine-based resins, and silicone-based resins. A fluorine-based resin (made by DuPont under the trade name of "PTFE") may also be used as an oil repellent material. In the case of using thin fluorine-based resin, the thickness thereof shall be 3 µm or less.

Figure 11A:
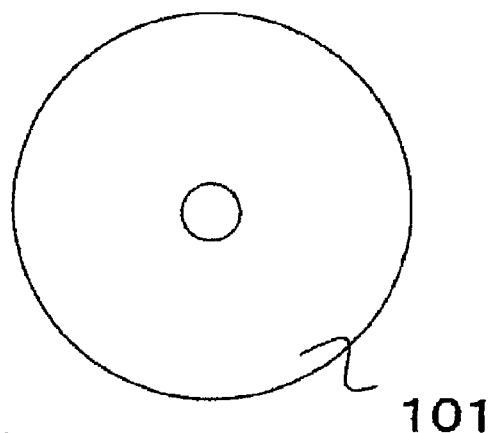
Figure 11B:
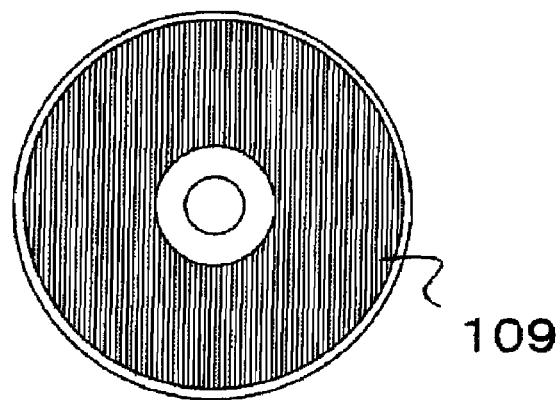
Figure 11C:
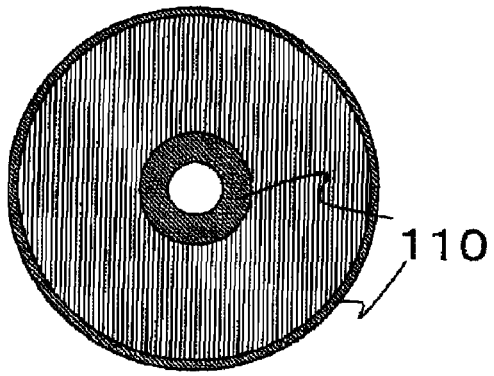
Figure 11D:
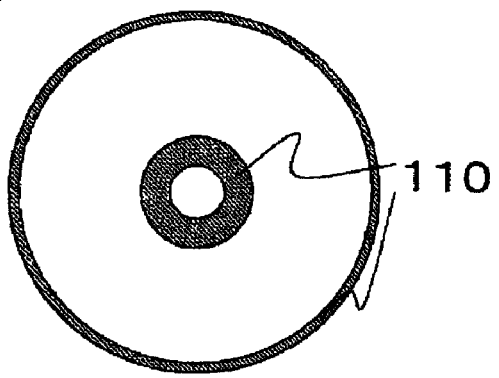

An example of such oil repellent treatment will be described below with reference to FIGS. 11A to 11D.

i) First, a first signal transfer substrate 101 is prepared (see FIG. 11A). In this first signal transfer substrate 101, for example, an inner peripheral portion 104a and an outer peripheral portion 104b are defined as non-resin-coated regions and the other portion is defined as a resin-coated region 105.

ii) The resin-coated region 105 is covered with a mask 109 (see FIG. 11B) to prevent the resin-coated region 105 from being coated with an oil repellent material. The thickness of the mask 109 is not particularly limited as long as it is usually used, but is preferably 500 µm or less. This is because if the thickness of the mask 109 is too large, it is impossible to apply an oil repellent material onto a boundary between the non-resin-coated region and the resin-coated region.

iii) The substrate 101 is spray-coated with an oil repellent material 110 (see FIG. 11C). It is to be noted that the spray-coating with the oil repellent material 110 can be performed by a well-known method.

iv) The mask 109 is removed from the resin-coated region 105 (see FIG. 11D).

By performing the above-described oil repellent treatment in such a manner as described above, it is possible to provide with oil repellency only to the inner and outer peripheral portions 104a and 104b as non-resin-coated regions of the substrate 101 without applying the oil repellent material onto the resin-coated region 105.

(c) Next, as shown in FIGS. 1(a) and 1(b), a UV-curing resin 106 is fed onto the signal transfer substrate 101 having the inner and outer peripheral portions 104a and 104b as non-resin-coated regions subjected to the above-descried oil repellent treatment and the resin-coated region 105 not subjected to oil repellent treatment. As the UV-curing resin 106, an acrylic UV-curing resin obtained by mixing an acrylic monomer with an acrylic oligomer and adding a photopolymerization initiator thereto is selected in consideration of adhesion to the signal transfer substrate and curing time. The amount of the UV-curing resin fed onto the signal transfer substrate is made larger than the product of the area of the resin-coated region 105 and a desirable thickness of the UV-curing resin. Particularly, from the viewpoint of preventing uneven coating, it is preferred that the UV-curing resin is previously and preliminarily applied onto substantially the entire surface of the resin-coated region 105 so as to be thicker than a desirable thickness. In this embodiment, the desirable thickness of the UV-curing resin 106 is 20 µm.

It is to be noted that during the feeding of the UV-curing resin, there is a case where air bubbles are trapped between the signal transfer substrate 101 and/or the UV-curing resin 106 or the UV-curing resin 106 contains air bubbles and/or foreign matter. These air bubbles and foreign matters become a cause of detection of wrong reproduced signals. In order to prevent entering of air bubbles and foreign matter into the UV-curing resin, the UV-curing resin is preferably fed slowly using a dispenser or the like. For example, feeding the UV-curing resin is performed in several seconds, more specifically in about two seconds.

(d) Next, as shown in FIGS. 1(c) and 1(d), a squeegee 107 is set so that the lowermost portion (i.e., the bottom surface) thereof is spaced 20 µm apart from the signal surface 102. Then, the squeegee 107 is moved in parallel with the signal surface 102 in a direction shown by the arrow in FIGS. 1(c) and 1(d) throughout the signal transfer substrate 101. By doing so, it is possible to remove the excess UV-curing resin 106 using the squeegee 107. The squeegee 107 has a flat bottom surface, and therefore the excess UV-curing resin 106 is removed by the squeegee 107 so that the UV-curing resin 106 can have a desired thickness (20 µm).

A material of the squeegee 107 is preferably a metal such as aluminum or stainless steel. In the case of this embodiment, the squeegee 107 made of stainless steel (SUS 304) is used. In addition, the length of the squeegee 107 orthogonal to the moving direction thereof is preferably longer than the diameter of the signal transfer substrate 101 by several centimeters.

The distance and parallelism between the bottom surface (i.e., the lowermost portion) of the squeegee 107 and the signal surface 102 and the flatness of the bottom surface of the squeegee 107 have a direct effect on the thickness of a formed resin layer and thickness uniformity in the resin layer. For this reason, in the case of this embodiment, the bottom surface of the squeegee 107 is processed so that the maximum height Rmax of the surface roughness thereof becomes 1 µm or less.

It is to be noted that the parallelism of the bottom surface of the squeegee 107 with respect to the signal transfer substrate 101 is repeatedly adjusted to improve thickness uniformity in the resin layer. In this regard, since the signal transfer substrate 101 is produced using an injection molding machine, all the signal transfer substrates 101 produced using the same molding machine and the same die have the same directional property in their thickness variation.

The thickness variation in the signal transfer substrate 101 results from the parallelism and flatness of a die set in an injection-molding machine. Therefore, in a case where injection molding is performed using a die having a sufficiently small flatness, the parallelism of the die becomes a main factor of a thickness variation in the signal transfer substrate 101. For example, in one direction along the diameter of the signal transfer substrate 101, one outer edge of the signal transfer substrate 101 has the largest thickness and the other outer edge of the signal transfer substrate 101 has the smallest thickness. Therefore, it is preferred that the direction property of the thickness variation in the signal transfer substrate 101 is taken into consideration when the squeegee 107 is set above the signal transfer substrate 101 on the table 103.

In such a manner as described above, the parallelism of the bottom surface of the squeegee 107 with respect to the signal transfer substrate 101 is adjusted to improve thickness uniformity in a resin layer formed by curing the UV-curing resin applied onto the signal transfer substrate 101. As a result, the resin layer formed on the entire resin-coated region 105 has an average thickness of, for example, 20 μm. The thickness variation in the resin layer is within ±1 μm. It is to be noted that thickness measurement is made using an optical film thickness-measuring instrument (manufactured by Steag under the trade name of "ETA-Optik GmbH") which measures a film thickness by using a spectrophotometer to measure a change in wavelength characteristics.

In a case where a resin is applied onto a disk by a conventional spin-coating method, the inner and outer peripheral portions thereof are not subjected to oil repellent treatment, and therefore it is possible to spread the resin to the edges of the disk. However, as described above, the outer peripheral portion does not have oil repellency and, in addition, the fed resin is not removed, and therefore an obtained resin layer tends to have a larger thickness in the outer peripheral portion of the disk due to surface tension (see FIG. 4(j)). On the other hand, according to a resin coating method of this embodiment, the resin is not applied onto the outer peripheral portion and, in addition, the excess resin is removed by the squeegee 107, and therefore it is possible to reduce an increase in the thickness of the resin layer in the outer peripheral portion.

It is to be noted that the average thickness of the resin layer can be controlled between 10 and 25 mm by adjusting the distance between the bottom surface of the squeegee 107 and the signal surface 102.

(e) Then, the squeegee 107 is passed through the inner peripheral portion 104a as a non-resin-coated region, and is then finally passed through the entire surface of the signal transfer substrate 101. FIGS. 1(e) and 1(f) are schematic diagrams, which show a state after the squeegee 107 is passed through the inner peripheral portion 104a as a non-resin-coated region. The squeegee 107 is moved across the signal surface 102 while scraping the excess UV-curing resin, and as a result, the excess UV-curing resin is pushed out of the signal transfer substrate 101 by the squeegee 107. The excess UV-curing resin pushed out of the outer edge of the signal transfer substrate 101 drops down by gravity along the inclined surface of the table 103. In this regard, it is to be noted that the pressure around the table 103 is preferably reduced to improve the efficiency of collecting the excess resin. Further, the signal transfer substrate 101 has a hole having an inner diameter of 10 mm, and therefore the excess resin falls down also through the hole by gravity. It is preferred that the table 103 has space 108 inside thereof and the space 108 is maintained at a low pressure to accelerate the dropping of the excess resin. More specifically, the pressure in the space 108 is preferably reduced by a pump (not shown in the Figures). This makes it possible to prevent the back surface of the signal transfer substrate 101 from being splashed with the dropped resin.

A faster traveling speed of the squeegee 107 is advantageous from the viewpoint of a production tact time. However, if the traveling speed of the squeegee 107 is too fast, air bubbles are contained in the resin layer and/or coating failure occurs so that part of the signal surface 102 is not coated with the UV-curing resin. For this reason, the traveling speed of the squeegee 107 is preferably 100 mm/s or less.

In this embodiment, the time for feeding a UV-curing resin is set to 2 seconds, the traveling speed of the squeegee 107 is set to 70 mm/s, and a tact time per resin layer is set to 4 seconds. It is to be noted that feeding a UV-curing resin refers to the above-described step (c) of feeding a UV-curing resin onto the disc (i.e., onto the signal transfer substrate 101) before moving the squeegee.

Through the above-described steps, a UV-curing resin layer 106 having excellent thickness uniformity is formed at high speed with high accuracy.

The above description has been made for a case where only one signal transfer substrate 101 is placed on the table, but the resin may be applied onto a plurality of signal transfer substrates 101 arranged on the same plane by feeding the resin onto the signal transfer substrates 101 and moving the squeegee across the signal transfer substrates 101 to remove the excess resin. By arranging a plurality of the substrates in this manner, it is possible to apply the resin onto a plurality of substrates continuously and therefore to improve the efficiency of application of the resin. In addition, it is also possible to apply the excess resin removed from one substrate onto another substrate adjacent to it and therefore to eliminate waste.

Figure 7A:
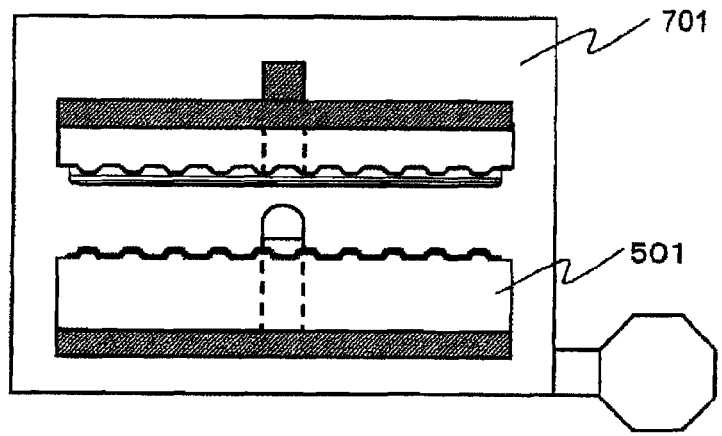
FIG. 7A is a cross-sectional view, which shows transferring a resin onto a first signal substrate in the method for producing a multilayer information recording medium according to the first embodiment of the present invention.
Figure 7B:
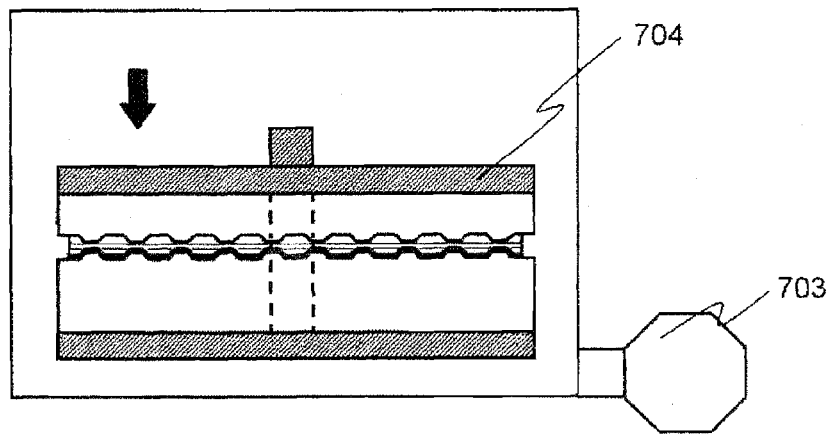
FIG. 7B is a cross-sectional view, which shows transferring a resin onto a first signal substrate in the method for producing a multilayer information recording medium according to the first embodiment of the present invention.
Figure 7C:
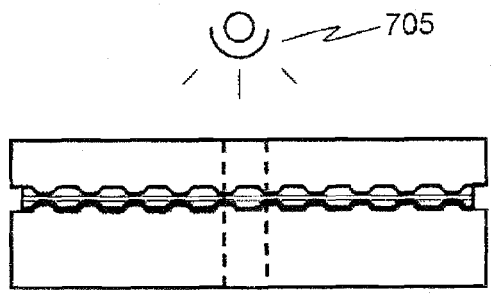
FIG. 7C is a cross-sectional view, which shows transferring a resin onto a first signal substrate in the method for producing a multilayer information recording medium according to the first embodiment of the present invention.
Figure 7D:
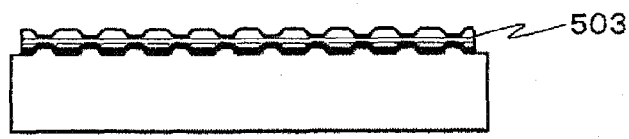
FIG. 7D is a cross-sectional view, which shows transferring a resin onto a first signal substrate in the method for producing a multilayer information recording medium according to the first embodiment of the present invention.

Hereinbelow, a signal transfer step will be described, in which the UV-curing resin layer formed on the signal transfer substrate 101 so as to have a uniform thickness is transported onto a first signal substrate 501 and then signals are transferred onto the UV-curing resin layer. FIGS. 7A to 7D are cross-sectional views which respectively show examples of steps in the signal transfer step of transferring signals onto the resin layer in an uncured state.

a) After the completion of formation of the UV-curing resin layer (in an uncured state) 106 on the signal transfer substrate 101, the signal transfer substrate 101 is transported into a vacuum chamber 701. At the same time, a first signal substrate 501 is also transported into the vacuum chamber 701. The signal transfer substrate 501 is a 1.1 mm-thick substrate having a signal surface provided with guide grooves or pits and a first thin film layer 502 laminated on the signal surface. The signal transfer substrate 101 has a center hole provided at the center thereof, in which a center boss is to be fitted to eliminate eccentricity between the signal transfer substrate 101 and the first signal substrate 501.

b) Then, air is exhausted from the vacuum chamber 701 by a vacuum pump 703 such as a rotary pump or a mechanical booster pump to create a vacuum atmosphere in the vacuum chamber 701 in a short time. When the degree of vacuum in the vacuum chamber 701 reaches 100 Pa or lower, the signal transfer substrate 101 having the UV-curing resin layer (in an uncured state) 106 formed thereon is laminated on the first signal substrate 501. At this time, a pressure plate 704 provided on the signal transfer substrate 101 applies pressure to the signal transfer substrate 101 to bond the UV-curing resin layer (in an uncured state) 106 and the first signal substrate 501 together. As described above, the vacuum chamber 701 is maintained under vacuum, which makes it possible to bond the UV-curing resin layer 106 and the first signal substrate 501 together without trapping air bubbles between them (see FIG. 7B).

c) The signal transfer substrate 101 and the first signal substrate 501 bonded together are taken out of the vacuum chamber 701, and are then irradiated with UV rays emitted from a UV irradiator 705 provided above the signal transfer substrate 101 (see FIG. 7C). By irradiating the entire surface of the UV-curing resin layer (in an uncured state) 106 with UV rays passing through the signal transfer substrate 101, it is possible to cure the UV-curing resin layer 106 to form a resin layer 503.

d) Compressed air is blown between the signal transfer substrate 101 and the UV-curing resin layer 503 (see FIG. 7C) to separate the signal transfer substrate 101 from the UV-curing resin layer 106 along the interface between them (see FIG. 7D).

Through the above-described steps, a resin layer 503 (after being cured) having a transferred signal surface is formed on the first thin film layer 502 provided on the first signal substrate 501.

It is to be noted that it is possible to further laminate a plurality of thin film layers and a plurality of resin layers on the first signal substrate 501 having the resin layer 706 in the same manner as in the case of lamination of the thin film layer 502 and the resin layer 503. For example, four information recording surfaces can be provided on the first signal substrate 501 by repeating a series of the following steps: forming a thin film layer in the same manner as in the case of the first thin film layer 502, such as sputtering; applying a UV-curing resin onto a signal transfer substrate to form a resin layer; and transferring signals onto the resin layer to form a signal surface by laminating together the signal transfer substrate and a signal substrate so that the resin layer faces toward the signal substrate.

The transparent layer 509 (see FIG. 5) as a reproduction surface is substantially transparent (i.e., has optical transparency) to recording/reproducing light. Such a transparent layer 509 is formed by applying a UV-curing resin containing, as a main component, an acrylic resin and removing the excess resin by a squeegee. The thickness of the transparent layer 509 is determined depending on the thickness of the resin layer(s) provided between the transparent layer 509 and the first signal substrate 501. More specifically, the thickness of the transparent layer 509 is determined so that the distance between the surface of the transparent layer 509 and the information recording layer provided on the first signal substrate 501 furthest from the surface of the transparent layer 509 becomes about 100 μm, within which the spherical aberration of a recording/reproducing head can be corrected. For example, in a case where the thickness of each of the resin layers (i.e., the second signal substrate 503, the third signal substrate 505, and the fourth signal substrate 507) is 25 μm, the thickness of the transparent layer 509 can be determined by the following formula: thickness of transparent layer 509=100 μm−25 μm×3 layers=25 μm. Further, in a case where the thickness of each of the resin layers is 10 μm, the thickness of the transparent layer 509 can be determined by the following formula: thickness of transparent layer 509=100 μm−10 μm×3 layers=70 μm.

According to the method for producing a multilayer information recording medium described above, each of the UV-curing resin layers is formed in such a manner that the outer diameter thereof is smaller than that of the first signal substrate 501 and the inner diameter thereof is larger than that of the first signal substrate 501. On the other hand, the transparent layer 509 is formed so as to be larger than the UV-curing resin layers in their radial outward direction so that these UV-curing resin layers are covered with the transparent layer 509 and the first signal substrate 501. In addition, the first signal substrate 501 made of polycarbonate and the transparent layer 509 made of a UV-curing resin are bonded together at the outer peripheral portion of the multilayer information recording medium, and therefore the UV-curing resin layers are sealed and delamination between the resin layer and the thin film layer can be prevented.

Further, according to the method for producing a multilayer information recording medium of the first embodiment, after the resin is fed onto the substrate, the squeegee is moved throughout the entire surface of the substrate so that the interval between the bottom surface of the squeegee and the surface of the substrate is kept constant. This makes it possible to reduce a thickness variation to form a resin layer having a uniform thickness and, in addition, to remove the excess resin. In this regard, it is preferred that the outer side surface of the first signal transfer substrate 101 is preferably subjected to oil repellent treatment. Oil repellency is provided to the outer side surface of the first signal transfer substrate 101, so that it is possible to suppress the entry of an UV-curing resin into the non-resin-coated region 104 and, in addition, to prevent the UV-curing resin from being adhered to the back surface of the first signal transfer substrate 101. In addition, it is also possible to reduce an increase in the thickness of the resin layer in the outer peripheral portion 104b.

Further, according to the method for producing a multilayer information recording medium of the first embodiment, it is possible to form each resin layer uniform in thickness at high speed without defects such as trapping air bubbles in the resin layers and curing failure. In addition, it is also possible to transfer a signal surface to each resin layer at high speed. According to the above effects, it is possible to produce a multilayer information recording medium capable of achieving good recording/reproducing. It is to be noted that the first embodiment has been described with reference to an optical information recording medium having 4 recording layers, but an information recording medium having 5 or more recording layers can be produced by adjusting the thickness of the first signal substrate 501, the thickness of each resin layer, and the thickness of the transparent layer.

Second Embodiment

A method for producing a multilayer information recording medium according to a second embodiment of the present invention is different from the method for producing a multilayer information recording medium according to the first embodiment in that a thin film containing a predetermined metal element is formed on a non-resin-coated region to provide with oil repellency to the non-resin-coated region. Other structures such as resin layers are formed in the same manner as in the case of the first embodiment. In the method for producing a multilayer information recording medium according to the second embodiment, an Au thin film (thickness: 40 nm) is formed on a non-resin-coated region of a signal transfer substrate with a magnetron sputtering apparatus to provide with oil repellency to the non-resin-coated region.

Hereinbelow, a method for forming a thin film containing a predetermined metal element on a non-resin-coated region will be described.

i) First, a first signal transfer substrate 101 is prepared. In the first signal transfer substrate 101, for example, an inner peripheral portion 104a and an outer peripheral portion 104b are defined as non-region-coated regions and the other portion is defined as a resin-coated region 105.

ii) The resin-coated region 105 is covered with a mask 109 to prevent the formation of a thin film containing a predetermined metal element on the resin-coated region 105. The thickness of the mask 109 is not particularly limited as long as it is usually used, but is preferably 500 μm or less. This is because if the thickness of the mask 109 is too large, it is impossible to form a metal thin film on a boundary between the non-resin-coated region and the resin-coated region.

iii) Next, the first signal transfer substrate 101 is placed in a chamber of a magnetron sputtering apparatus, and the degree of vacuum in the chamber is maintained at $1 \times 10^{-4}$ Pa or less. Then, Ar gas is fed into the chamber while the chamber is kept being exhausted using a pump. It is to be noted that as the magnetron sputtering apparatus, an SME series sputtering system manufactured by ULVAC, Inc. is used.

iv) After the pressure in the chamber is stabilized at 0.2 Pa, a direct voltage of 300 W is applied to a target for 3 minutes to form an Au thin film having a desired thickness on the first signal transfer substrate 101. The contact angle of the Au thin film with a resin is larger than that of the material of the first signal transfer substrate 101 (i.e., a polyolefin resin) with the resin, which produces the same effect as obtained by the oil repellent treatment described with reference to the first embodiment. It is to be noted that the magnetron sputtering apparatus is used for forming a thin film, but a thin film forming apparatus is not limited thereto. For example, a vapor deposition apparatus may be used for forming a metal thin film. Also in this case, the same effect as described above can be obtained.

v) The mask 109 is removed from the resin-coated region 105.

According to such oil repellent treatment as described above, an Au thin film is not formed on the resin-coated region 105, and therefore it is possible to provide with oil repellency only to the inner peripheral portion 104a and the outer peripheral portion 104b as non-resin-coated regions of the first signal transfer substrate 101.

It is to be noted that the contact angle with a UV-curing resin (manufactured by Nippon Kayaku Co., Ltd. under the trade name of "DVD001") can be measured using an automatic contact angle measuring instrument manufactured by EKO Instruments Co., Ltd. under the trade name of "OCA20". The contact angle (unit: degree) of the Au thin film with the UV-curing resin is 82° (degrees), and the contact angle of the material (i.e., a polyolefin rein) of the first signal transfer substrate with the UV-curing resin is 24° (degrees). It is to be noted that metals other than Au can also produce substantially the same oil repellent effect as obtained by Au as long as thin films thereof have a contact angle of 70° (degrees) or more with the resin. The present inventors have searched metal elements having oil repellent effect other than Au, and as a result, they have found that Cu and Ni also have excellent oil repellent effect.

It is to be noted that the thin film for oil repellent treatment is formed of one or two or more of these metal elements. The thin film may further contain, in addition to one or two or more of the above-mentioned metal elements, one or more nonmetal elements.

As described above, by forming an Au thin film on the non-resin-coated region 104 of the first signal transfer substrate 101, it is possible to significantly increase the contact angle of the non-resin-coated region 104 with the UV-curing resin. This makes it possible to form a uniform thickness coating of the UV-curing resin only on the resin-coated region 105 without applying the UV-curing resin onto the non-resin-coated region 104.

Thereafter, as in the case of the first embodiment, the first signal transfer substrate and a first signal substrate are laminated together in a vacuum atmosphere with a lamination apparatus (see FIGS. 7A and 7B) to transport a UV-curing resin layer (in an uncured state) onto the first signal substrate, and the resin layer is cured by exposure to UV rays. On the thus formed resin layer, an information recording layer is further laminated. A series of these steps described above are repeated until a desired number of information recording layers can be obtained, and then a transparent layer is finally formed to complete the production of a multilayer information recording medium.

Third Embodiment

A method for producing a multilayer information recording medium according to a third embodiment of the present invention is different from the methods for producing a multilayer information recording medium according to the first and second embodiments in that a predetermined oil repellent seal is attached to a non-resin-coated region to provide with oil repellency to the non-resin-coated region. Other structures such as resin layers are formed in the same manner as in the case of the first embodiment. In the method for producing a multilayer information recording medium according to the third embodiment, an UV-curing resin is applied onto a signal transfer substrate after an oil repellent seal is attached to a non-resin-coated region of the signal transfer substrate.

Hereinbelow, a method for attaching a predetermined oil repellent seal to a non-resin-coated region to provide with oil repellency to the non-resin-coated region will be described.

i) First, a first signal transfer substrate 101 is prepared. In the first signal transfer substrate 101, for example, an inner peripheral portion 104a and an outer peripheral portion 104b are defined as non-resin-coated regions and the other portion is defined as a resin-coated region 105. More specifically, the outer peripheral portion 104b as a non-resin-coated region of the first signal transfer substrate 101 is defined as a portion outside a circle having a radius of 59.5 mm from the center of the first signal transfer substrate 101 but inside a circle having a radium of 60.0 mm from the center of the first signal transfer substrate 101 (i.e., an outer edge of the first signal transfer substrate 101), and the inner peripheral portion 104a as a non-resin-coated region of the first signal transfer substrate 101 is defined as a portion surrounding a center hole (diameter φ: 15 mm), formed at the center of the first signal transfer substrate 101, so as to have a width of 10 mm from the edge of the center hole in the radial direction.

ii) Then, an oil repellent seal is attached to the non-resin-coated region 104 of the first signal transfer substrate 101. The oil repellent seal used herein is a plastic film having an oil repellent surface. By attaching such an oil repellent seal to a specified area, it is possible to provide with oil repellency to the specified area. Examples of a material of the oil repellent seal include plastics such as polyethylene, polyethylene terephthalate, and polyimide. If the oil repellent seal has a thickness larger than that of a resin layer to be formed on the first signal transfer substrate 101, the squeegee is brought into contact with the oil repellent seal and therefore the resin layer cannot have a desired thickness. For this reason, the thickness of the oil repellent seal to be attached to the non-resin-coated region 104 is preferably smaller than that of a resin layer to be formed on the first signal transfer substrate 101. It is to be noted that the oil repellent seal used in the third embodiment is a 10 μm-thick seal made of polyethylene terephthalate, which is mainly used for condensers.

By attaching the oil repellent seal to the non-resin-coated region 104 in such a manner as described above, it is possible to provide with oil repellency only to the inner peripheral portion 104a and the outer peripheral portion 104b as non-resin-coated regions of the first signal transfer substrate 101.

Hereinbelow, applying a resin onto the first signal transfer substrate 101 having the oil repellent seal attached to the non-resin-coated region 104 thereof will be described.

A UV-curing resin is applied onto the first signal transfer substrate 101 having the oil repellent seal attached to the non-resin-coated regions 104a and 104b thereof, and then the excess resin is scraped off the first signal transfer substrate with a squeegee. Then, the oil repellent seal is removed from the non-resin-coated region 104. As a result, a uniform thickness layer of the UV-curing resin is formed on only the resin-coated region 105 without forming a resin layer on the non-resin-coated regions 104a and 104b.

Thereafter, as in the case of the first embodiment, the first signal transfer substrate and a first signal substrate are laminated together in a vacuum atmosphere with a laminating apparatus (see FIGS. 7A and 7B) to transport a UV-curing resin layer (in an uncured state) 106 onto the first signal substrate, and the resin layer is cured by exposure to UV rays. On the thus formed resin layer, a thin film layer as an information recording layer is further laminated. Then, a transparent layer is finally formed to complete the production of a multilayer information recording medium. It is to be noted that by repeating forming a resin layer and laminating an information recording layer on the resin layer according to the third embodiment, it is possible to produce a multilayer information recording medium.

According to the third embodiment, it is possible to easily apply the UV-curing resin having a uniform thickness only on the resin-coated region, and therefore to form each resin layer (i.e., a signal substrate) having a uniform thickness at high speed to produce a multilayer information recording medium. In addition, as described above, since the first signal transfer substrate 101 and the first signal substrate 501 are laminated together in a vacuum atmosphere, signals are transferred to the resin layer (in an uncured state) at high speed without defects such as trapping of air bubbles in the resin layer and curing failure. Such advantages make it possible to produce a multilayer information recording medium capable of achieving good recording/reproducing.

Fourth Embodiment

As compared with the methods for producing a multilayer information recording medium according to the first to third embodiments, a method for producing a multilayer information recording medium according to a fourth embodiment of the present invention is different in that a transparent layer covering the surface of a multilayer information recording medium is formed by using a squeegee to scrape an excess resin off a signal substrate. More specifically, according to the method for producing a multilayer information recording medium of the fourth embodiment, a transparent layer covering the surface of a multilayer information recording medium is formed by applying a resin onto a signal substrate and moving a squeegee, provided above the signal substrate, across the entire surface of the signal substrate in such a manner that the interval between the bottom surface of the squeegee and the surface of the signal substrate is kept constant to scrape the excess resin off the signal substrate.

In addition, the method for producing a multilayer information recording medium according to the fourth embodiment is different from the methods according to the first to third embodiments also in that a UV-curing resin is applied not onto a first signal transfer substrate 101 but onto a first thin film layer 502 of a first signal substrate 501. It is to be noted that a resin layer on the first signal substrate 501 may be formed by applying a UV-curing resin onto the first thin film layer 502 of the first signal substrate 501 and then laminating the first signal substrate 501 and the first signal transfer substrate 101 together according to the fourth embodiment, but may also be formed by applying a UV-curing resin onto a signal surface of the first signal transfer substrate 101 and then laminating the first signal transfer substrate 101 and the first signal substrate 501 together according to the first to third embodiments. In the fourth embodiment, oil repellent treatment for providing with oil repellency to a non-resin-coated region may be performed according to any one of the methods described with reference to the first to third embodiments before application of the UV-curing resin.

Hereinbelow, a method for attaching an oil repellent seal to a non-resin-coated region will be described as in the case of the third embodiment.

i) First, a first signal substrate 501 having a first thin film layer 502 laminated thereon is prepared. In the first signal substrate 501, for example, an inner peripheral portion 104a and an outer peripheral portion 104b are defined as non-resin-coated regions and the other portion is defined as a resin-coated region 105.

ii) Then, a 15 μm-thick oil repellent seal is attached to the inner peripheral portion 104a and the outer peripheral portion 104b as non-resin-coated regions of the first signal substrate 501 having the first thin film layer 502 laminated thereon.

By attaching the oil repellent seal to the non-resin-coated region 104 in such a manner as described above, it is possible to provide with oil repellency only to the inner peripheral portion 104a and the outer peripheral portion 104b as non-resin-coated regions of the signal transfer substrate 101.

Hereinbelow, applying a resin onto the first signal substrate 501 having the oil repellent seal attached to the non-resin-coated region 104 thereof will be described.

A UV-curing resin is applied onto the first signal substrate 501 having the oil repellent seal attached to the non-resin-coated regions 104a and 104b thereof, and then the excess UV-curing resin is scraped off the first signal substrate 501 with a squeegee to form a 20 μm-thick UV-curing resin layer. Then, the oil repellent seal attached to the non-resin-coated region 104 is removed. As a result, a uniform thickness layer of the UV-curing resin is formed only on the resin-coated region 105 without forming a resin layer on the non-resin-coated regions 104a and 104b.

Figure 8A:
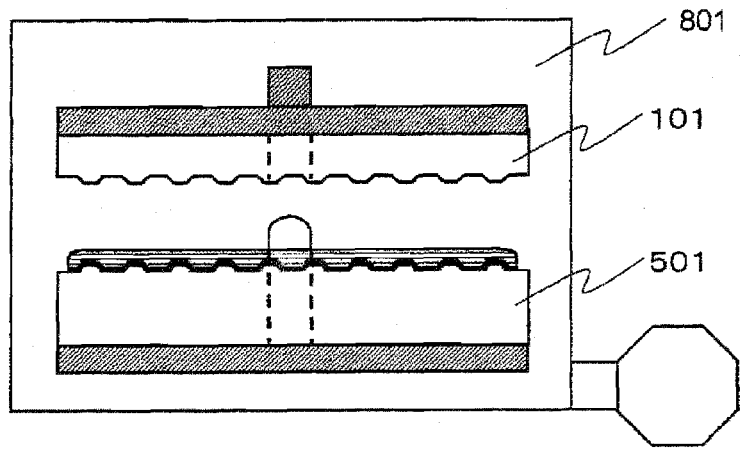
FIG. 8A is a cross-sectional view, which shows transferring signals onto a resin layer in a method for producing a multilayer information recording medium according to a fourth embodiment of the present invention.
Figure 8B:
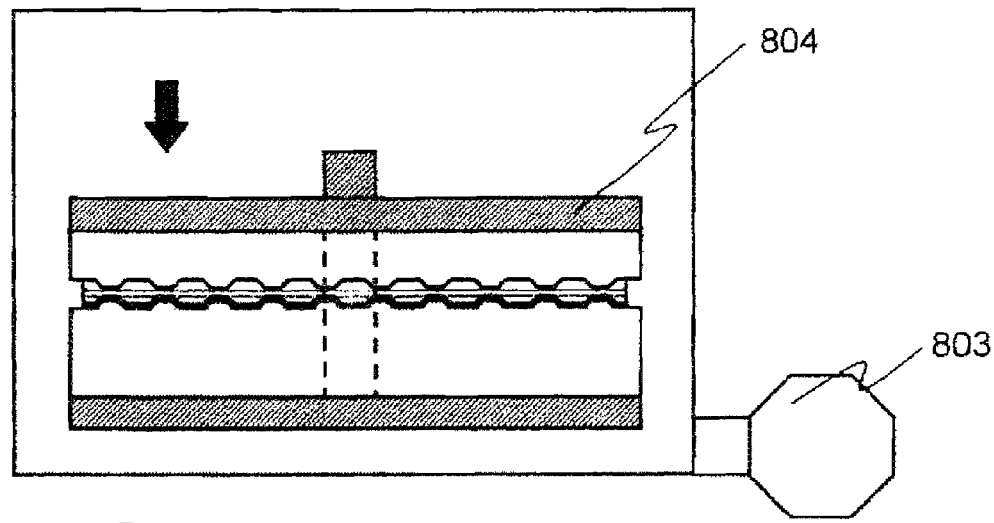
FIG. 8B is a cross-sectional view, which shows transferring signals onto a resin layer in a method for producing a multilayer information recording medium according to a fourth embodiment of the present invention.
Figure 8C:
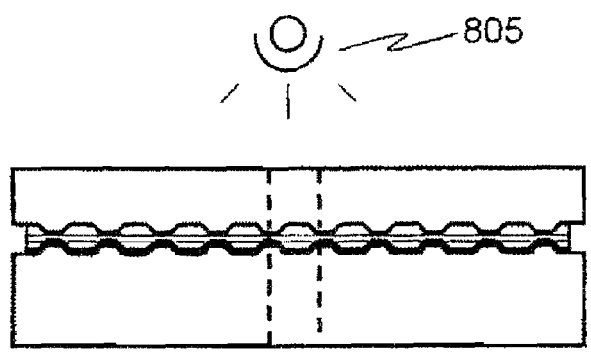
FIG. 8C is a cross-sectional view, which shows transferring signals onto a resin layer in a method for producing a multilayer information recording medium according to a fourth embodiment of the present invention.
Figure 8D:
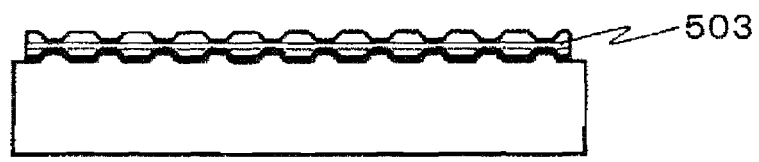
FIG. 8D is a cross-sectional view, which shows transferring signals onto a resin layer in a method for producing a multilayer information recording medium according to a fourth embodiment of the present invention.
Figure 10:
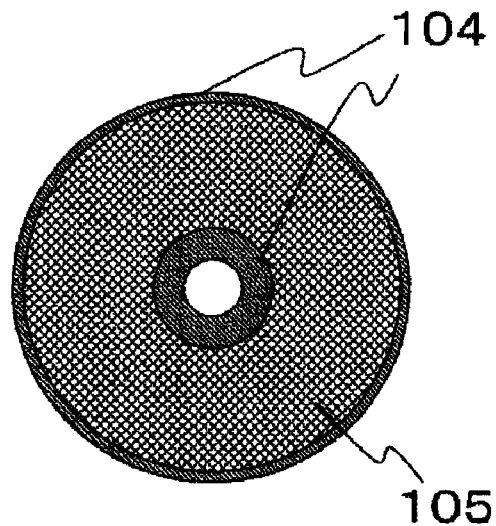
FIG. 10 is a plan view of a substrate having a non-resin-coated region subjected to an oil repellent treatment and a resin-coated region not subjected to oil repellent treatment.

Thereafter, a signal surface is transferred onto the resin layer (in an uncured state) formed on the first signal substrate 501 using a signal transfer substrate 101 having the signal surface. This signal transfer step will be described with reference to FIGS. 8A to 8D. FIGS. 8A to 8D are cross-sectional views which show an example of the signal transfer step of transferring a signal surface onto a resin layer (in an uncured state) according to the fourth embodiment.

a) After the completion of the application of the UV-curing resin onto the first thin film layer 502 of the first signal substrate 501, the first signal substrate 501 is transported into a vacuum chamber 801. At the same time, a signal transfer substrate 101 is also transported into the vacuum chamber 801. The first signal substrate 501 is a 1.1 mm-thick substrate having a signal surface provided with guide grooves or pits and a first thin film layer 502 formed on the signal surface. The signal transfer substrate 101 has a center hole provided at the center thereof, in which a center boss is to be fitted to eliminate eccentricity between the signal transfer substrate 101 and the first signal substrate 501 (see FIG. 8A).

b) Then, air is exhausted from the vacuum chamber 801 by a vacuum pump 803 such as a rotary pump or a mechanical booster pump to create a vacuum atmosphere in the vacuum chamber 801 in a short time. When the degree of vacuum in the vacuum chamber 801 reaches 100 Pa or lower, the signal transfer substrate 101 is laminated on the first signal substrate 501 having a UV-curing resin layer (in an uncured state) 106 formed thereon. At this time, a pressure plate 804 provided on the signal transfer substrate 101 applies pressure to the signal transfer substrate 101 to transfer the signal surface of the signal transfer substrate 101 onto the UV-curing resin layer (in an uncured state) 106. As described above, the vacuum chamber 801 is maintained under vacuum, which makes it possible to laminate the UV-curing resin layer 106 and the signal transfer substrate 101 together without trapping air bubbles between them (see FIG. 8B).

c) The signal transfer substrate 101 and the first signal substrate 501 laminated together are taken out of the vacuum chamber 801, and are then irradiated with UV rays emitted from a UV irradiator 805 provided above the signal transfer substrate 101 (see FIG. 8C). By irradiating the entire surface of the UV-curing resin layer 106 with UV rays passing through the signal transfer substrate 101, it is possible to cure the UV-curing resin layer 106 to form a resin layer 503.

d) Then, compressed air is blown between the signal transfer substrate 101 and the UV-curing resin layer 503 (see FIG. 8C) to separate the signal transfer substrate 101 from the UV-curing resin layer 106 along the interface between them (see FIG. 8D).

Through the above-described steps, a resin layer 503 having a transferred signal surface is formed on the first thin film layer 502 of the first signal substrate 501. As a result, the first signal substrate 501 has a second signal surface.

Thereafter, a second thin film layer (i.e., an information recording film) is formed on the second signal surface with, for example, a magnetron sputtering apparatus.

Finally, a method for forming a transparent layer 509 covering the surface of a multilayer information recording medium will be described with reference to FIGS. 9(a) to 9(f). FIGS. 9(a) to 9(f) show forming a transparent layer 509 on the first signal substrate 501 having the second signal substrate 503 (i.e., a resin layer) and the second thin film layer 504 (i.e., an information recording layer) laminated thereon in order.

a) First, a resin-coated region where a transparent layer is to be formed and a non-resin-coated region where a transparent layer is not to be formed are provided in the first signal substrate 501 having the second signal substrate (i.e., a resin layer) and the second thin film layer (i.e., an information recording layer) laminated thereon in order. It is to be noted that the non-resin-coated region provided for forming a transparent layer is different from that provided for forming a resin layer as a second signal substrate. More specifically, in the case of forming a resin layer as a second signal substrate, an inner peripheral portion 904a and an outer peripheral portion 904b are defined as non-resin-coated regions, but in the case of forming a transparent layer, the outer peripheral portion 904b is defined as a resin-coated region because the outer peripheral portion 904b also needs to be covered with the transparent layer. As described above, since a resin is applied also onto the outer peripheral portion 904b when the transparent layer is formed, an outer side surface 904c is defined as a non-resin-coated region. That is, in the case of forming a transparent layer, the inner peripheral portion 904a and the outer side surface 904c are defined as non-resin-coated regions. Therefore, for example, the oil repellent seal attached to the outer peripheral portion 904b is removed, and the oil repellent seal is attached to the outer side surface 904c instead of providing with oil repellency thereto. In this way, only the inner peripheral portion 904a and the outer side surface 904c are made to have higher oil repellency to a UV-curing resin.

b) The first signal substrate 901 having the second thin film layer (i.e., an information recording layer) formed thereon is fixed to a substrate-holding table 903 by vacuum suction. Then, as shown in FIGS. 9(a) and 9(b), an UV-curing resin 906 is fed onto a recording surface 902 of the first signal substrate 901.

c) Then, as shown in FIGS. 9(c) and 9(d), a squeegee 907 is moved throughout the first signal substrate 901 in such a manner that the interval between the bottom surface of the squeegee 907 and the surface of the first signal substrate 901 is kept constant to scrape the excess UV-curing resin 906 off the first signal substrate 901.

d) Then, as shown in FIGS. 9(e) and 9(f), the squeegee 907 is passed through the inner peripheral portion 904a as a non-resin-coated region, and is then finally passed through the entire surface of the first signal substrate 901. It is to be noted that FIGS. 9(e) and 9(f) are schematic diagrams, which show a state after the squeegee 907 is passed through the inner peripheral portion 904a as a non-resin-coated region. At this time, the resin 906 is not applied onto the inner peripheral portion 904a and the outer side surface 904c as non-resin-coated regions because they are covered with the oil repellent seal. The excess resin 906 is dropped down through a center hole 908 of the substrate-holding table 903 and pushed out of the outer edge of the first signal substrate 901 (i.e., a disk).

e) The resin 906 is cured with light to form a transparent layer 906.

Through the above steps, a multilayer information recording medium having a uniform thickness transparent layer 906 is formed.

It is to be noted that by setting the interval between the bottom surface of the squeegee 907 and the recording surface 902 to 75 µm and strictly maintaining the parallelism between them, it is possible to form a transparent layer 906 having a thickness of 75 µm with an accuracy of, for example, +1 µm.

Although the present invention has been described in detail with reference to the above preferred embodiments, the present invention is not limited thereto. It will be apparent to those skilled in the art that many preferred variations and modifications are possible within the technical scope of the present invention as specified in the appended claims.

The multilayer information recording medium according to the present invention and the production method thereof are useful as an optical disk or the like, in which a plurality of information recording surfaces are contained in a single recording medium, and a production method of such a recording medium. The present invention can be applied not only to optical disks but also to information memory cards and the like.

The invention claimed is:

1. A method for producing a multilayer information recording medium having at least two information recording layers and a resin layer interposed between each pair of the information recording layers, the method comprising:
    holding a substrate;
    forming a metal film on a specified area of the substrate so as to subject the specified area, of the substrate to an oil repellent treatment to increase the contact angle of the specified area with the resin;
    feeding a resin onto the substrate; and
    removing the excess resin by moving a squeegee throughout the entire surface of the substrate so that the interval between the bottom surface of the squeegee and the surface of the substrate is kept constant.

2. The method for producing a multilayer information recording medium according to claim 1, wherein the substrate has a resin-coated region, onto which the resin is to be applied, and a non-resin-coated region, onto which the resin is not to be applied, wherein the resin-coated region has a smaller contact angle with the resin than the non-resin-coated region.

3. The method for producing a multilayer information recording medium according to claim 1, wherein the metal film contains, as a main component, at least one of Au, Cu, and Ni.

4. The method for producing a multilayer information recording medium according to claim 1, wherein, in the step of carrying out the oil repellent treatment, an oil repellent seal having a thickness smaller than that of a resin layer to be formed on the substrate is attached to the specified area of the substrate.

5. The method for producing a multilayer information recording medium according to claim 1, wherein the specified area to be subjected to the oil repellent treatment includes an inner peripheral portion and an outer peripheral portion of the substrate.

6. The method for producing a multilayer information recording medium according to claim 1, wherein, in the step of removing the excess resin, the squeegee is moved throughout the entire surface of the substrate so that the bottom surface of the squeegee is parallel to the surface of the substrate to keep the interval between the bottom surface of the squeegee and the surface of the substrate constant.

7. The method for producing a multilayer information recording medium according to claim 1, wherein the resin is a UV-curing resin.

8. The method for producing a multilayer information recording medium according to claim 1, wherein, in the step of holding a substrate, the substrate is held on a substrate-holding table.

9. The method for producing a multilayer information recording medium according to claim 8, wherein the inner diameter of the substrate-holding table is larger than that of the substrate and the outer diameter of the substrate-holding table is smaller than that of the substrate.

10. The method for producing a multilayer information recording medium according to claim 8, wherein the substrate-holding table has oil repellency to the resin.

11. The method for producing a multilayer information recording medium according to claim 1, wherein the substrate is a signal transfer substrate having a signal surface.

12. The method for producing a multilayer information recording medium according to claim 11, further comprising:
laminating a signal substrate having an information recording layer formed on the surface of the signal transfer substrate coated with the resin so that the information recording layer faces toward the signal transfer substrate;
curing the resin interposed between the signal transfer substrate and the signal substrate to form a resin layer; and
separating the signal transfer substrate from the cured resin layer along the interface between them.

13. The method for producing a multilayer information recording medium according to claim 12, wherein laminating together the signal transfer substrate and the signal substrate having an information recording layer formed thereon is performed in a vacuum atmosphere.

14. The method for producing a multilayer information recording medium according to claim 13, wherein the signal transfer substrate is made of a polyolefin resin.

15. The method for producing a multilayer information recording medium according to claim 1, wherein the substrate is a signal substrate having a signal surface formed thereon.

16. The method for producing a multilayer information recording medium according to claim 15, further comprising:
laminating a signal transfer substrate having a signal surface on the surface of the signal substrate coated with the resin so that the signal surface of the signal transfer substrate faces toward the signal substrate;
curing the resin layer interposed between the signal substrate and the signal transfer substrate; and
separating the signal transfer substrate from the cured resin layer along the interface between them.

17. The method for producing a multilayer information recording medium according to claim 16, wherein laminating together the signal substrate and the signal transfer substrate having a signal surface is performed in a vacuum atmosphere.

* * * * *